US008699043B2

(12) United States Patent
Gotoh et al.

(10) Patent No.: US 8,699,043 B2
(45) Date of Patent: Apr. 15, 2014

(54) IMAGE PROCESSING APPARATUS, IMAGE FORMING APPARATUS, IMAGE PROCESSING METHOD, AND COMPUTER-READABLE STORAGE MEDIUM CONTAINING IMAGE PROCESSING PROGRAM

(75) Inventors: Makio Gotoh, Osaka (JP); Yasutaka Hirayama, Osaka (JP); Sohichi Yoshimura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 606 days.

(21) Appl. No.: 12/583,803

(22) Filed: Aug. 26, 2009

(65) Prior Publication Data
US 2010/0053682 A1    Mar. 4, 2010

(30) Foreign Application Priority Data
Aug. 27, 2008   (JP) .................. 2008-218842

(51) Int. Cl.
  G06F 3/14    (2006.01)
  G06F 3/12    (2006.01)
  H04N 1/38    (2006.01)

(52) U.S. Cl.
  USPC .......... 358/1.13; 358/1.1; 358/1.9; 358/1.16; 358/1.17; 358/2.1; 715/273; 715/274; 715/277; 382/163; 382/165; 382/168; 382/173; 382/171; 382/309

(58) Field of Classification Search
  CPC ............. G06F 3/12; G06F 3/14; G06F 15/16; H04N 1/00411; H04N 1/00416; H04N 1/0044
  USPC .......... 358/1.11–1.18, 1.1, 1.9, 2.1, 400–404, 358/462, 3.21–3.23; 382/165, 312, 199, 382/305; 715/273, 255; 399/45
  See application file for complete search history.

(56) References Cited

U.S. PATENT DOCUMENTS 5,566,001 A    10/1996  Saidi et al.
5,652,663 A     7/1997  Zelten
(Continued)

FOREIGN PATENT DOCUMENTS

JP    H09-044128 A    2/1997
JP     9-135316 A    5/1997
(Continued)

OTHER PUBLICATIONS

U.S. Appl. No. 12/754,398, M. Gotoh.
(Continued)

Primary Examiner — Chad Dickerson
(74) Attorney, Agent, or Firm — Edwards Wildman Palmer LLP; David G. Conlin; David A. Tucker

(57) ABSTRACT

An image processing apparatus of the present invention includes: a blank document determination section determining whether or not input image data is image data of a blank document, regardless of a process mode set for setting a process with respect to the input image data; a storage device storing the input image data in association with a determination result made by the blank document determination section; and a control section (i) reading out the input image data from the storage device and (ii) excluding the input image data determined as image data of a blank document by the blank document determination section, from images to be displayed by the image display device, when the image display device carries out a preview display of the input image data. This configuration makes it possible to carry out a preview display in which a blank document (blank page document) is skipped, without reading the document again.

9 Claims, 19 Drawing Sheets

(56) References Cited

U.S. PATENT DOCUMENTS

| | | | |
|---|---|---|---|
| 5,987,221 A | 11/1999 | Bearss et al. | |
| 6,037,939 A | 3/2000 | Kashiwagi et al. | |
| 6,204,932 B1 | 3/2001 | Haneda et al. | |
| 6,233,057 B1 * | 5/2001 | Ota | 358/1.13 |
| 6,839,151 B1 | 1/2005 | Andree et al. | |
| 6,856,423 B2 * | 2/2005 | Anderson et al. | 358/1.18 |
| 6,900,902 B1 | 5/2005 | Tanaka | |
| 7,536,055 B2 | 5/2009 | Ogawa | |
| 8,125,693 B2 | 2/2012 | Arai | |
| 8,305,645 B2 | 11/2012 | Gotoh et al. | |
| 2003/0044082 A1 | 3/2003 | Katayama et al. | |
| 2005/0190382 A1 * | 9/2005 | van Os | 358/1.1 |
| 2006/0215231 A1 * | 9/2006 | Borrey et al. | 358/448 |
| 2007/0035706 A1 | 2/2007 | Margulis | |
| 2007/0280533 A1 | 12/2007 | Huang | |
| 2008/0285079 A1 | 11/2008 | Kurakata | |
| 2009/0033964 A1 * | 2/2009 | Kubota | 358/1.9 |
| 2009/0116738 A1 | 5/2009 | Kubota | |
| 2010/0002259 A1 * | 1/2010 | Maruyama et al. | 358/1.15 |

FOREIGN PATENT DOCUMENTS

| | | | |
|---|---|---|---|
| JP | 9-233321 A | | 9/1997 |
| JP | 11-284846 A | | 10/1999 |
| JP | 2002-077669 A | | 3/2002 |
| JP | 2002-116665 A | | 4/2002 |
| JP | 2004-235680 A | | 8/2004 |
| JP | 2005-354591 A | | 12/2005 |
| JP | 2006-180343 A | | 7/2006 |
| JP | 2007-028336 A | | 2/2007 |
| JP | 2007208618 A | * | 8/2007 |
| JP | 2008-118565 A | | 5/2008 |

OTHER PUBLICATIONS

U.S. Office Action for U.S. Appl. No. 12/583,807 dated Jul. 8, 2011.
U.S. Office Action for U.S. Appl. No. 12/547,624 dated Nov. 21, 2011.
U.S. Appl. No. 12/583,807, Yasutaka Hirayama et al.
U.S. Appl. No. 12/586,957, Makio Gotoh.
U.S. Appl. No. 12/547,965, Gotoh et al.
U.S. Appl. No. 12/547,557, Ohwaku et al.
U.S. Appl. No. 12/547,624, Masanori Minami.
U.S. Appl. No. 12/547,989, Gotoh.
U.S. Office Action for U.S. Appl. No. 12/547,989 dated Mar. 2, 2012.
Non-Final Office Action issued for co-pending corresponding U.S. Appl. No. 12/547,965 (dated Jun. 19, 2012).
U.S. Notice of Panel Decision dated Aug. 21, 2012 for U.S. Appl. No. 12/547,624.
Non-Final Office Action issued for co-pending corresponding U.S. Appl. No. 12/586,957 (dated Jun. 20, 2012).
The Advisory Action for U.S. Appl. No. 12/547,624 dated Jul. 6, 2012.
U.S. Office Action dated Apr. 18, 2012 for U.S. Appl. No. 12/547,624.
U.S. Office Action dated Apr. 30, 2012 for U.S. Appl. No. 12/496,911.
U.S. Office Action dated Jun. 14, 2012 for U.S. Appl. No. 12/496,911.
U.S. Office Action dated Dec. 21, 2012 for U.S. Appl. No. 12/547,557.
U.S. Final Office Action dated Sep. 6, 2012 for U.S. Appl. No. 12/547,989.
U.S. Office Action dated Jan. 16, 2013 for U.S. Appl. No. 12/547,624.
U.S. Office Action dated Mar. 1, 2013 for co-pending U.S. Appl. No. 12/547,989.
Office Action for the U.S. Appl. No. 12/547,624 dated Jul. 15, 2013.
Office Action for the U.S. Appl. No. 12/754,398 dated Jun. 6, 2013.
Office Action for the U.S. Appl. No. 12/547,557 dated Jun. 14, 2013.
Notice of Allowance dated Sep. 19, 2013 for U.S. Appl. No. 12/547,624.
U.S. Final Office Action dated Sep. 13, 2013 for U.S. Appl. No. 12/547,989.
Office Action dated Dec. 3, 2013 for U.S. Appl. No. 12/547,989.

* cited by examiner

F I G. 1 2
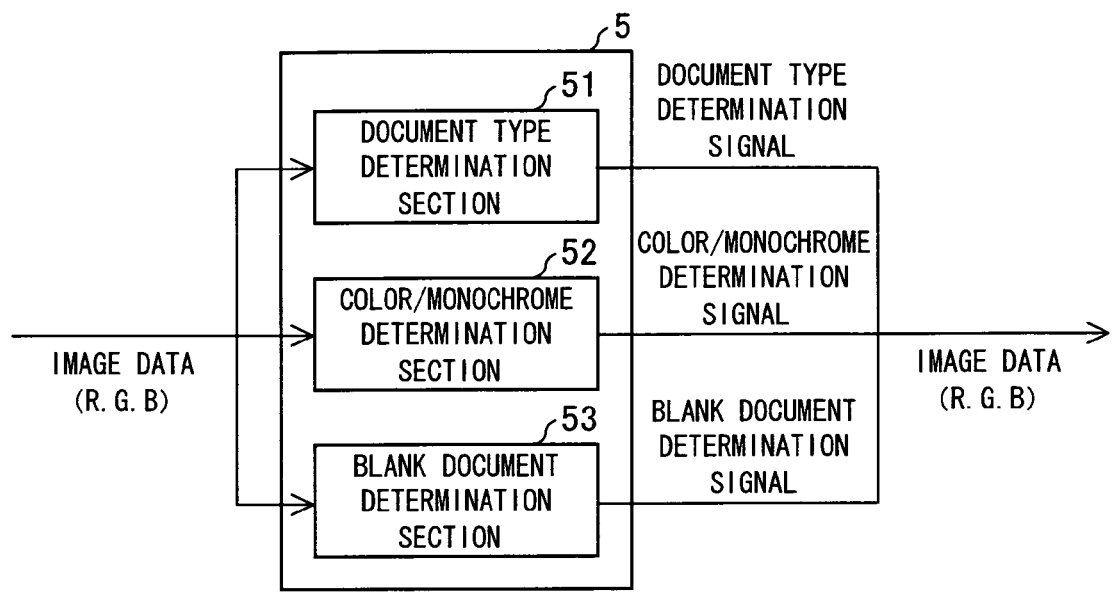

IMAGE PROCESSING APPARATUS, IMAGE FORMING APPARATUS, IMAGE PROCESSING METHOD, AND COMPUTER-READABLE STORAGE MEDIUM CONTAINING IMAGE PROCESSING PROGRAM

This Nonprovisional application claims priority under 35 U.S.C. §119(a) on Patent Application No. 2008-218842 filed in Japan on Aug. 27, 2008, the entire contents of which are hereby incorporated by reference.

TECHNICAL FIELD

The present invention relates to an image processing apparatus, an image forming apparatus, an image processing method, and a computer-readable storage medium containing an image processing program, each of which serves to display a thumbnail or preview of input image data.

BACKGROUND ART

When image forming apparatuses such as copying machines and multifunction printers scan documents by, for example, an ADF (Auto Document Feeder) so as to carry out copying, scan to e-mail, or filing, a plurality of documents to be scanned may include both a one-sided document and a two-sided document. In such a case, the following operations are required: first, the one-sided document and the two-sided document are separated; then, respective documents are scanned; and subsequently the documents scanned are reordered in an original order.

When the one-sided document and the two-sided document that are not separated are scanned and printed, an unwanted blank sheet may be outputted. Further, when a blank color sheet is mixed in, color toner (or ink) may be wasted. In cases where documents are filed, a memory such as a hard disk may be unnecessarily used if a blank sheet is mixed in. In order to solve these problems, for example, a method disclosed in Patent Literature 1 is proposed. According to the method of Patent Literature 1, a user can select a blank-document-page skip mode and a blank-document-page insert mode. When the blank-document-page skip mode is selected, image data of a blank document is detected in image data by comparing the image data with blank reference data and image formation of the detected image data is skipped by discarding the detected image data. In cases where the blank-document-page insert mode is selected, blank page data is inserted when image formation is carried out.

CITATION LIST

Patent Literature 1

Japanese Patent Application Publication, Tokukaihei, No. 9-233321 (published on Sep. 5, 1997)

Patent Literature 2

Japanese Patent Application Publication, Tokukaihei, No. 9-135316 (published on May 20, 1997)

SUMMARY OF INVENTION

Technical Problem

Some image forming apparatuses such as copying machines and multifunction printers display, in accordance with image data processed according to document types and setting conditions (e.g., print density, enlarging/reducing ratio, single-side printing/duplex printing, margin size), a preview of a single image to be printed or a combination of images to be printed. According to the conventional technique described above, unless the blank-document-page skip mode is selected in advance, the blank-document-page skip mode cannot be reflected on the preview when (i) a preview of a document scanned is displayed and (ii) any of processings such as printing, facsimile transmission, e-mail transmission, and filing is carried out. For example, when the blank-document-page skip mode has not been selected, documents need to be scanned anew for displaying a preview in which the blank document is removed.

The present invention is attained in view of the above problems. The present invention is to provide an image processing apparatus and the like that makes it possible to display, without reading documents again, a preview in which a blank document (a blank page document, a solid-color document) is skipped. The blank document (a blank page document, a solid-color document) here means a document on which no image is formed regardless whether a background is colored or white.

Solution to Problem

In order to solve the problems above, the image processing apparatus of the present invention supplying input image data to an image display device for carrying out a preview display as well as to a job apparatus for executing any of an image print job, an image transmission job, and an image filing job, the input image data being image data of a document read by an image input apparatus, the image processing apparatus includes: a blank document determination section determining whether or not the input image data is image data of a blank document, regardless of a process mode set for setting a process with respect to the input image data; a storage device storing (i) a determination result that is made by the blank document determination section regarding the input image data and (ii) the input image data in association with each other; and a preview control section (i) reading out the input image data from the storage device and (ii) excluding the input image data determined as image data of a blank document by the blank document determination section, from images to be displayed by the image display device, when the image display device carries out a preview display of the input image data.

Advantageous Effects of Invention

It is determined whether or not input image data is image data of a blank document, regardless of a process mode set for setting a process with respect to the input image data, and the input image data is stored in association with a result of the determination. Then, the input image determined as input image data of a blank document is excluded from the image data to be displayed by the image display device. In other words, at the time of a preview display, a preview can be displayed with reference to the result of the determination as to whether or not the image data is image data of a blank document. Therefore, for example, even in cases where it is not set in advance to display a preview in which such a blank document is skipped, the preview can be displayed, without reading documents again, by reading out image data except the image data of a blank document with reference to the result of the determination in a storage device in a manner in which the image data of a blank document is skipped. This makes it possible to provide an image processing apparatus that is convenient for a user and that is capable of displaying a preview in which a blank document is skipped.

For a fuller understanding of the nature and advantages of the invention, reference should be made to the ensuing detailed description taken in conjunction with the accompanying drawings.

BRIEF DESCRIPTION OF DRAWINGS

FIG. 12 is a block diagram showing an automatic document type discrimination section of another embodiment.

DESCRIPTION OF EMBODIMENTS

Embodiment 1

Figure 1:
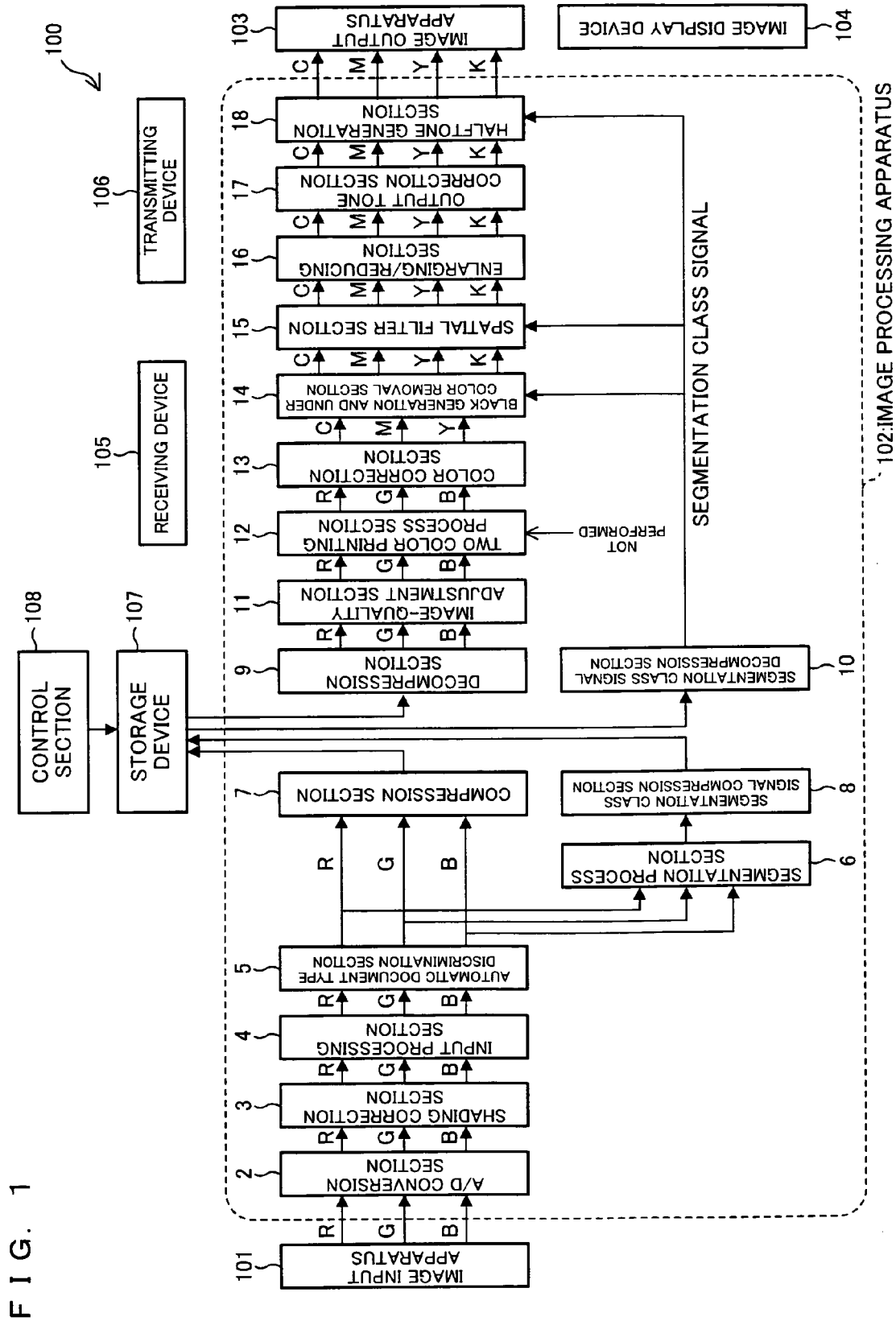
FIG. 1 is a block diagram showing an image forming apparatus of the present embodiment and showing the flow of image data in a printing process in a copier mode and a full-color mode.

One embodiment of an image forming apparatus of the present invention is described below with reference to the attached drawings. FIG. 1 is a block diagram schematically showing an arrangement of an image forming apparatus 100 of the present embodiment.

The image forming apparatus 100 of the present embodiment is a digital color multifunction printer that executes a mode selected from among a copier mode, a print mode, a facsimile transmission mode, a facsimile reception mode, and an image transmission mode.

The copier mode (copy mode) means a mode in which to read image data (generates image data by scanning a document) and print an image of the image data onto a sheet of paper. The print mode means a mode in which to print, onto a sheet of paper, an image of image data sent from a terminal apparatus connected to the image forming apparatus 100. The facsimile transmission mode means: a normal facsimile mode in which to transmit, to an external apparatus via a telephone line, image data obtained by scanning a document; and an Internet facsimile mode in which to transmit an e-mail with the image data attached thereto. The facsimile reception mode means a mode in which to receive image data from an external apparatus by facsimile and print an image of the received image data onto a sheet of paper. The image transmission mode means: (1) a mode (scan to e-mail mode) in which to attach, to an e-mail, image data generated by scanning a document, and transmit the e-mail to a specified address; (2) a mode (scan to ftp mode) in which to transmit, to a folder specified by a user, image data generated by scanning a document; and (3) a mode (scan to usb mode) in which to transmit, to a USB memory mounted in the image forming apparatus 100, image data generated by scanning a document. It should be noted that the facsimile transmission mode and the image transmission mode are each classified as above according to the type of image processing operation.

Further, in the copier mode or print mode, the user can select a black-and-white mode in which to output a black-and-white image, a full-color mode in which to output a full-color mage, a single-color mode in which to output a monochrome image having only one color desired by the user, or a two-color mode in which to output a two-color image having black and one color desired by the user.

For example, in cases where the user selects the single-color mode in the copier mode or print mode, the monochromatic image is printed. Further, in cases where the user selects the two-color mode in the copier mode or print mode, the two-color image is printed. It should be noted that in the single-color mode or two-color mode, the user selects his/her desired color from among R (red), G (green), B (blue), C (cyan), M (magenta), and Y (yellow).

Further, according to the present invention it is possible to set an automatic discrimination mode in the copier mode. In the automatic discrimination mode, the image forming apparatus 100 performs auto color selection (ACS) for judging whether an object to be copied is a color document or a black-and-white document. In the case of a color document, the image forming apparatus 100 performs an output process in the full-color mode. In the case of a black-and-white document, the image forming apparatus 100 performs an output process in the black-and-white mode.

As shown in FIG. 1, the image forming apparatus 100 includes an image input apparatus 101, an image processing apparatus 102, an image output apparatus 103, an image display device 104, a receiving device 105, a transmitting device 106, a storage device 107, and a control section 108.

The image input apparatus 101 is image scanning means for generating image data by scanning a document in the copier mode, the facsimile transmission mode, and the image transmission mode. More specifically, the image input apparatus 101, which includes a scanner section having a CCD (charge-coupled device), converts light reflected by a document into an electrical signal separated into colors RGB (i.e., into an analog image signal) and sends the electrical signal to the image processing apparatus 102.

It should be noted that the image input apparatus 101 scans a document image in full color in any one of the full-color mode, the single-color mode, and the two-color mode. Further, the image input apparatus 101 scans a document image in full color even in cases where the image processing apparatus 102 performs the aforementioned auto color selection.

The image processing apparatus 102 is an integrated circuit, constituted by an ASIC (application specific integrated circuit), which performs image processing on image data (image signals). As shown in FIG. 1, the image processing apparatus 102 includes the following blocks: an A/D (analog/digital) conversion section 2, a shading correction section 3, an input processing section 4, an automatic document type discrimination section 5, a segmentation process section 6, a compression (encode) section 7, a segmentation class signal compression (encode) section 8, a decompression (decode) section 9, a segmentation class signal decompression (decode) section 10, an image-quality adjustment section 11, a two-color printing process section 12, a color correction section 13, a black generation and under color removal section 14, a spatial filter section 15, an enlarging/reducing (zoom process) section 16, an output tone correction section 17, and a halftone generation section 18. Processes that are performed by the blocks of the image processing apparatus 102 will be detailed later.

In the copier mode, facsimile transmission mode, or image transmission mode, the image processing apparatus 102 performs image processing on image data sent from the image input apparatus 101. In the print mode, the image processing apparatus 102 performs image processing on image data transmitted from a terminal apparatus. In the facsimile reception mode, the image processing apparatus 102 performs image processing on image data received from an external apparatus. Then, in the copier mode, print mode, or facsimile reception mode, the image processing apparatus 102 transmits, to the image output apparatus 103, the image data subjected to image processing. In the facsimile transmission mode, the image processing apparatus 102 transmits, to the transmitting device 106, the image data subjected to image processing. Further, in the scan to e-mail mode, which is an image transmission mode, the image processing apparatus 102 transmits, to a mail processing section (not shown), the image data subjected to image processing. In the scan to ftp mode, which is another image transmission mode, the image processing apparatus 102 transmits, to a predetermined folder, the image data subjected to image processing. In the scan to usb mode, which is the other image transmission mode, the image processing apparatus 102 transmits, to a predetermined USB memory, the image data subjected to image processing.

The image output apparatus (printer) 103 forms, onto a recording medium (e.g., a sheet of paper), an image of image data sent from the image processing apparatus 102. An example is an electrophotographic or ink-jet color printer. The term "printing" in the present embodiment means printing in the print mode, printing in the copier mode, or printing in the facsimile reception mode.

The image display device 104 is a liquid crystal display provided in an operation panel (not shown) of the image forming apparatus 100, and is display means capable of displaying a color image. Further, the image display device 104, covered with a touch panel, functions as an input interface of the image forming apparatus 100. That is, the image display device 104 displays a GUI for inputting various commands to the image forming apparatus 100 and an operation guide.

Further, before execution of printing in the copier mode or facsimile reception mode, the image forming apparatus 100 of the present embodiment can display, on the image display device 104, a preview of an image to be printed. Furthermore, before execution of transmission in the facsimile transmission mode or image transmission mode, the image forming apparatus 100 of the present embodiment can display, on the image display device 104, a preview of an image to be transmitted.

Further, in the copier mode or image transmission mode and the full-color mode, the image display device 104 displays a preview of a full-color image. In the copier mode or image transmission mode and the single-color mode, the image display device 104 displays a preview of a monochrome image. In the copier mode or image transmission mode and the two-color mode, the image display device 104 displays a preview of a two-color image.

The image display device 104 is not limited to the liquid crystal display, and may be display means other than the liquid crystal display (e.g., an organic EL display or a plasma display).

The receiving device 105 is a device, connected to a telephone line or the Internet, which receives image data from an external apparatus by facsimile communication. Further, the transmitting device 106 is a device, connected to a telephone line or the Internet, which transmits, to an external apparatus by facsimile communication, image data inputted to the image input apparatus 101.

The storage device 107 is a hard disk in which image data to be processed in the image processing apparatus 102 is temporarily stored.

The control section 108 is a computer including a processor such as a CPU (central processing unit) or a DSP (digital signal processor), and comprehensively controls various types of hardware provided in the image forming apparatus 100. Further, the control section 108 functions to control data transfer between pieces of hardware provided in the image forming apparatus 100.

The following details the processes that are executed by the blocks of the image processing apparatus 102 in the copier mode, the facsimile transmission mode, the facsimile reception mode, and the image transmission mode, respectively. It should be noted that the image processing apparatus 102 of the present embodiment has a block that operates while a mode a is being used but does not operate while a mode b different from the mode a is being used (the mode a and the mode b each being any one of the copier mode, the facsimile transmission mode, the facsimile reception mode, and the image transmission mode). Further, the image processing apparatus 102 has a block that varies in processing according to the mode being used. Furthermore, the image processing apparatus 102 has: a block that, even in the same mode, operates in processing of image data to be printed (transmitted) but does not operate in processing of image data to be previewed; and a block that, even in the same mode, varies between processing of image data to be printed (transmitted) and processing of image data to be previewed. In the following, therefore, the processes that are executed by the blocks of the image processing apparatus 102 are described according to the type of mode, and those processes which are executed in a printing process (or in a transmission process) and those processes which are executed at the time of a preview display are described separately.

(1) Copier Mode (1-1) Printing Process (Image Print Job)

In the following, the image processing apparatus 102 is described with reference to FIG. 1, which shows the flow of image data in the image processing apparatus 102 performing a printing process in the copier mode and the full-color mode.

The A/D (analog/digital) conversion section 2 is a block that receives color image signals (RGB analog signals) from the image input apparatus 101 and converts the color image signals into digital image data (RGB digital signals). The shading correction section 3 is a block that receives image data form the A/D conversion section 2 and subjects the image data to a process of removing various distortions generated in illuminating, image-focusing, and image-sensing systems of the image input apparatus 101. The input processing section 4 is a block that receives RGB image data from the shading correction section 3 and subjects each of the RGB image data to a tone conversion process such as a gamma correction process.

In accordance with RGB image data (RGB density signals) subjected to processing such as gamma correction in the input processing section 4, the automatic document type discrimination section 5 discriminates among types of documents scanned by the image input apparatus 101. It should be noted here that the types of documents among which the automatic document type discrimination section 5 discriminates are a text document, a printed-picture document, a text/printed-picture document containing a text and a printed picture together, and the like. Further, in accordance with the image data, the automatic document type discrimination section 5 can perform auto color selection (ACS) for judging whether a scanned document is a color document or a black-and-white document and a process for judging whether or not a scanned document is a blank document (a solid-color document). It should be noted that the automatic document type discrimination section 5 sends the RGB image data to the segmentation process section 6 and the compression section 7.

In accordance with the RGB image data sent from the automatic document type discrimination section 5, the segmentation process section 6 performs a process of judging, for each pixel of the input image, what image area the pixel is classified into and generating a segmentation class signal indicating a result of the judgment. It should be noted here that the types of image areas among which the segmentation process section 6 discriminates are a black text area, a color text area, a halftone dot area, and the like. The segmentation process may take the form of a process of judging, for each block of pixels, what image area the block is classified into, instead of taking the form of a process of judging, for each pixel, what image area the pixel is classified into.

The compression section 7 is a block that performs a process of encoding image data (RGB signals) sent from the automatic document type discrimination section 5. The encoding is performed, for example, based on JPEG (Joint Photographic Experts Group).

The segmentation class signal compression section 8 is a block that performs a compression (encode) process on a segmentation class signal generated for each pixel. The compression process in the segmentation class signal compression section 8 is performed, for example, based on MMR (Modified Modified Reed) or MR (Modified Reed), which is a lossless compression technology.

The control section 108 receives encoded codes (encoded image data) from the compression section 7 and segmentation class signal codes (encoded segmentation class signals) from the segmentation class signal compression section 8, stores them temporarily in the storage device 107, and manages them as filing data. Then, in response to an instruction for a copy output operation, the control section 108 reads out, from the storage device 107, an encoded code and a segmentation class signal code corresponding to the encoded code, and sends them to the decompression section 9 and the segmentation class signal decompression section 10, respectively.

The control section 108 writes the storage address or data name of the encoded code and the storage address of the segmentation class signal code in a management table in association with each other. That is, the control section 108 controls reading or writing of encoded codes and segmentation class signal codes with reference to the management table.

The decompression section 9 decompresses the encoded code into RGB image data by performing a decompression (decode) process on the encoded code. Further, the segmentation class signal decompression section 10 performs a decompression process on the segmentation class signal code. The resulting segmentation class signal is sent to the black generation and under color removal section 14, the spatial filter section 15, and the halftone generation section 18. Then, the black generation and under color removal section 14, the spatial filter section 15, and the halftone generation section 18 select image processing according to the type of image area.

The image-quality adjustment section 11 receives the RGB image data from the decompression section 9, and performs background removal correction on the RGB image data by detecting a background in the RGB image data. Furthermore, the image-quality adjustment section 11 adjusts RGB balance (color adjustment of red, green, or blue), brightness, and intensity (saturation) in accordance with configuration information inputted by the user from the operation panel (not shown).

Furthermore, in the single-color mode, the image-quality adjustment section 11 converts the RGB image data into CMY image data complementary to the RGB image data. It should be noted here that the conversion of the RGB data into the CMY image data in the single-color mode is executed by using Eq. (1) below, where the coefficients r1 to r3 are defined based on [Table 1]. For example, in cases where the user selects cyan as his/her desired color in the single-color mode, the values of r1 to r3 in the column "Cyan" are referred to, with the result that r1=1, r2=0, and r3=0 are selected.

$$\begin{pmatrix} C \\ M \\ Y \end{pmatrix} = \begin{pmatrix} r1 \cdot a1 & r1 \cdot a2 & r1 \cdot a3 \\ r2 \cdot a1 & r2 \cdot a2 & r2 \cdot a3 \\ r3 \cdot a1 & r3 \cdot a2 & r3 \cdot a3 \end{pmatrix} \times \begin{pmatrix} R \\ G \\ B \end{pmatrix} + \begin{pmatrix} r1 \cdot c \\ r2 \cdot c \\ r3 \cdot c \end{pmatrix} \quad \text{Eq. (1)}$$

$a1 = -0.23046875$ $a2 = -0.79296875$ $a3 = 0.0234375$ $c = 255$

TABLE 1

| Adjustment Plane | Output Color (Single Color) | | | | | |
|---|---|---|---|---|---|---|
| | Red | Green | Blue | Cyan | Magenta | Yellow |
| r1 | 0 | 1 | 1 | 1 | 0 | 0 |
| r2 | 1 | 0 | 1 | 0 | 1 | 0 |
| r3 | 1 | 1 | 0 | 0 | 0 | 1 |

Figure 2:
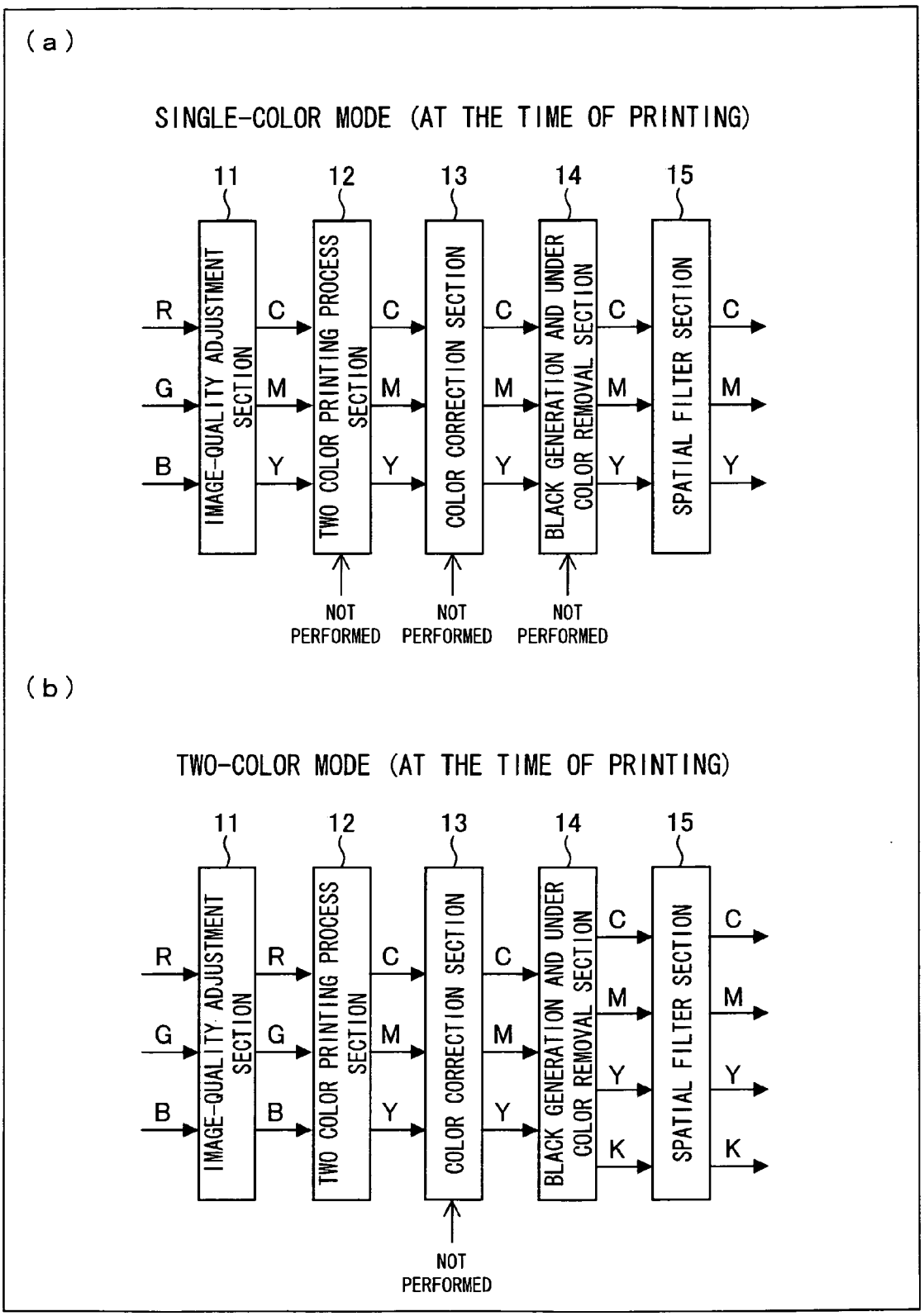
FIG. 2 shows block diagrams showing a part inside of an image processing apparatus (a) performing a printing process in the copier mode and a single-color mode and (b) performing a printing process in the copier mode and a two-color mode.

That is, whereas the output from the image-quality adjustment section 11 in the full-color mode is RGB image data as shown in FIG. 1, the output from the image-quality adjustment section 11 in the single-color mode is CMY image data as shown in (a) of FIG. 2. It should be noted that the output from the image-quality adjustment section 11 in the two-color mode is RGB image data as shown in (b) of FIG. 2. (a) of FIG. 2 shows some of the blocks of the image processing apparatus 102 performing a printing process in the copier mode and the single-color mode, and (b) of FIG. 2 shows some of the blocks of the image processing apparatus 102 performing a printing process in the copier mode and the two-color mode.

Further, the adjustment of intensity by the image-quality adjustment section 11 can be realized by using the matrix of Eq. (1) after varying the values of r1 to r3 and a1 to a3 of the matrix. This makes it possible to use the same matrix and the same image processing circuit for the adjustment of intensity and the conversion of image data (from RGB into CMY) in the single-color mode. Therefore, in the present embodiment, the adjustment of intensity and the conversion of image data in the single-color mode are performed by the same processing section (image-quality adjustment section 11).

The two-color printing process section 12 is a block that, in the two color mode, receives RGB image data from the image-quality adjustment section 11 and converts the RGB image into CMY image data as shown in (b) of FIG. 2. The conversion of the RGB image data into the CMY image data in the two-color mode can be realized, for example, by a technique of [Embodiment 1] or [Embodiment 2] described in Japanese Patent Application Publication, Tokukai, No. 2007-28336 A.

Further, in the full-color mode, as shown in FIG. 1, the two-color printing process section 12 performs no processing on the image data sent from the image-quality adjustment section 11 and passes the image data directly on to the color correction section 13. Furthermore, in the single-color mode, as shown in (a) of FIG. 2, two-color printing process section 12 performs no processing on the CMY image data sent from the image-quality adjustment section 11 and passes the image data directly on to the color correction section 13.

The color correction section 13 is a block that, in the full-color mode, receives RGB image data from the two-color printing process section 12, performs a color correction process of converting the RGB image data into CMY image data, and performs a process of improving the color reproducibility of the image data. The color correction process is realized by creating an LUT (look-up table) of input values (RGB) and output values (CMY) associated with one another and looking up the output values in the created LUT.

Further, in the single-color mode or two-color mode, as shown in FIG. 2, the color correction section 13 performs no processing on the CMY image data sent from the two-color printing process section 12 and passes the image data directly on to the black generation and under color removal section 14.

The black generation and under color removal section 14 is a block that, in the full-color mode or two-color mode, receives CMY image data from the color correction section 13, generates black (K) image data from the CMY image data, and generate new CMY image data by subtracting the black (K) image data from the original CMY image data. Thus, in the full-color mode or two-color mode, as shown in FIG. 1 or (b) of FIG. 2, the black generation and under color removal section 14 converts the CMY image data into four colors of image data CMYK.

Further, in the single-color mode, as shown in (a) of FIG. 2, the black generation and under color removal section 14 performs no processing on the CMY image data sent from the color correction section 13 and passes the image data directly on to the subsequent spatial filter section 15.

In the full-color mode or two-color mode, the output from the black generation and under color removal section 14 and the input to and output from each block subsequent to the black generation and under color removal section 14 are CMYK image data as shown in FIG. 1. Meanwhile, in the single-color mode, the output from the black generation and under color removal section 14 and the input to and output from each block subsequent to the black generation and under color removal section 14 are CMY image data unlike in FIG. 1.

The spatial filter section 15 receives the CMYK or CMY image data from the black generation and under color removal section 14 and performs a spatial filter process (e.g., edge enhancement process, smoothing process) on the image data by a digital filter in accordance with the segmentation class signals. That is, the spatial filter section 15 executes image processing differently for each image area in accordance with the segmentation class signals.

The enlarging/reducing section 16 is a block that enlarges or reduces an image in accordance with an enlarging/reducing command (information indicating the zoom ratio of a printed image) inputted by the user from the operation panel (not shown).

The output tone correction section 17 is a block that receives image data from the enlarging/reducing section 16 and performs output gamma correction for outputting the image data onto a recording medium such as a sheet of paper. The halftone generation section 18 executes, by dithering or error diffusion, a tone reproduction process (halftone generation process) necessary for the image output apparatus 103 to print an image.

Then, the halftone generation section 18 passes the CMYK or CMY image data on to the image output apparatus 103, and the image output apparatus 103 prints an image of the image data onto a recording medium (e.g., a sheet of paper).

(1-2) Preview Display

Figure 3:
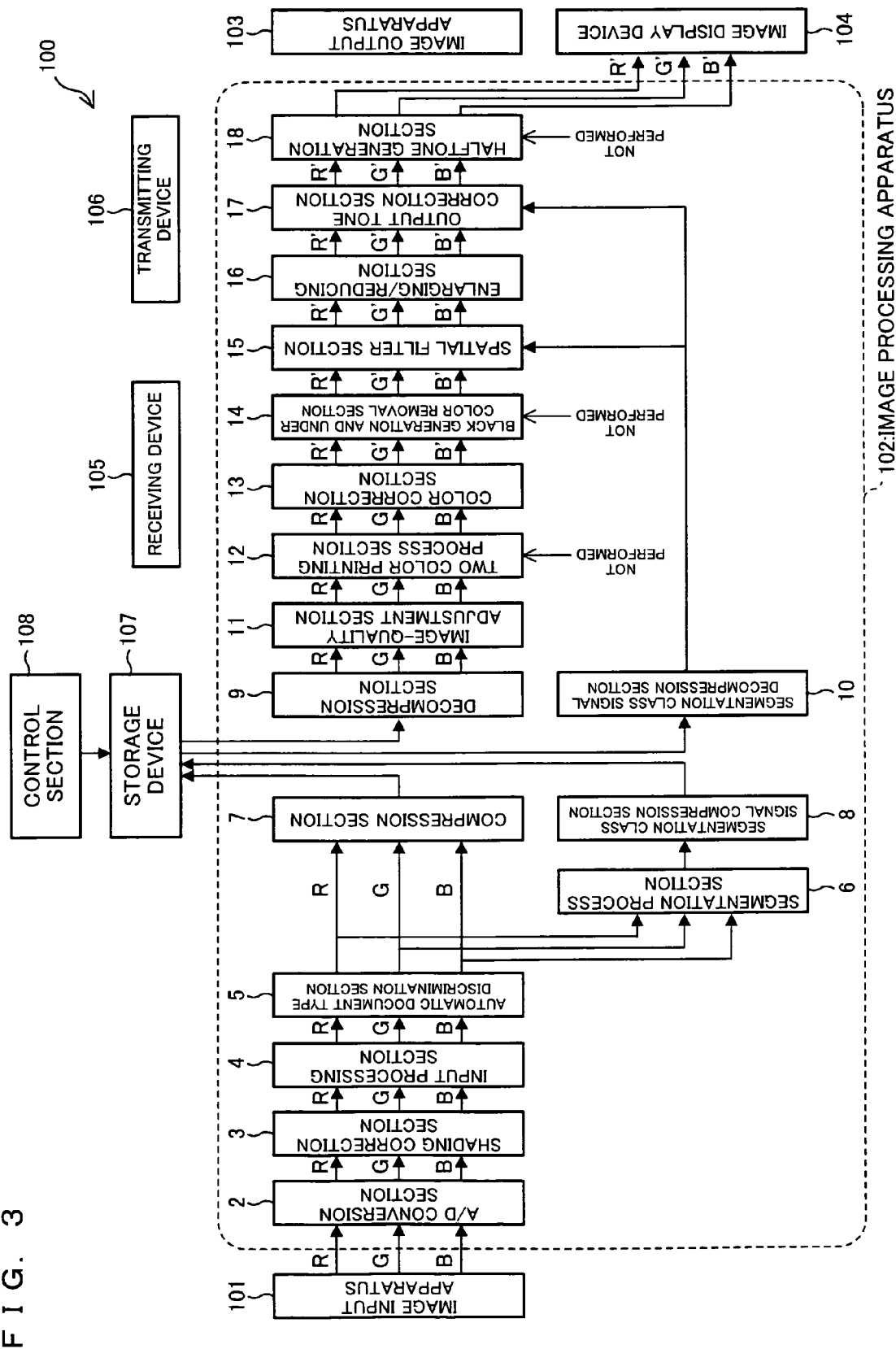
FIG. 3 is a block diagram showing the image forming apparatus of the present embodiment and showing the flow of image data in a preview display process in the copier mode and the full-color mode.

Next, the processes that are executed by the blocks of the image processing apparatus 102 in cases where a preview of an image to be printed is displayed in the copier mode are described with reference to FIG. 3. FIG. 3 is a block diagram showing the same image forming apparatus 100 as in FIG. 1 and showing the flow of image data at the time of a preview display process in the copier mode and the full-color mode.

It should be noted that because the A/D (analog/digital) conversion section 2, the shading correction section 3, the input processing section 4, the automatic document type discrimination section 5, the segmentation process section 6, the compression section 7, the segmentation class signal compression section 8, the decompression section 9, the image-quality adjustment section 11, and the two-color printing process section 12 perform the same processes as in the case of a printing process, such processes will not be described below.

At the time of a preview display, as shown in FIG. 3, the segmentation class signal decompression section 10 decompresses (decodes) segmentation class signals and passes them on to the spatial filter section 15 and the output tone correction section 17.

In the full-color mode, the color correction section 13 receives RGB image data in color space of the scanner (image input apparatus 101). Then, the color correction section 13 converts the RGB image data into R'G'B' image data in color space of the image display device 104.

That is, the color correction section 13 converts the RGB image data, which conform to the image scanning characteristics of the scanner, into the R'G'B' image data, which conform to the display characteristics of the display device. It should be noted that the conversion of the RGB image data into the R'G'B' image data is also realized by creating an LUT (look-up table) of input values (RGB) and output values (R'G'B') associated with one another and looking up the output values in the created LUT.

Moreover, in the full-color mode, the present embodiment uses the same image processing circuit for the conversion of RGB image data into CMYK image data at the time of a printing process and the conversion of RGB image data into R'G'B' image data at the time of a preview display.

Figure 4:
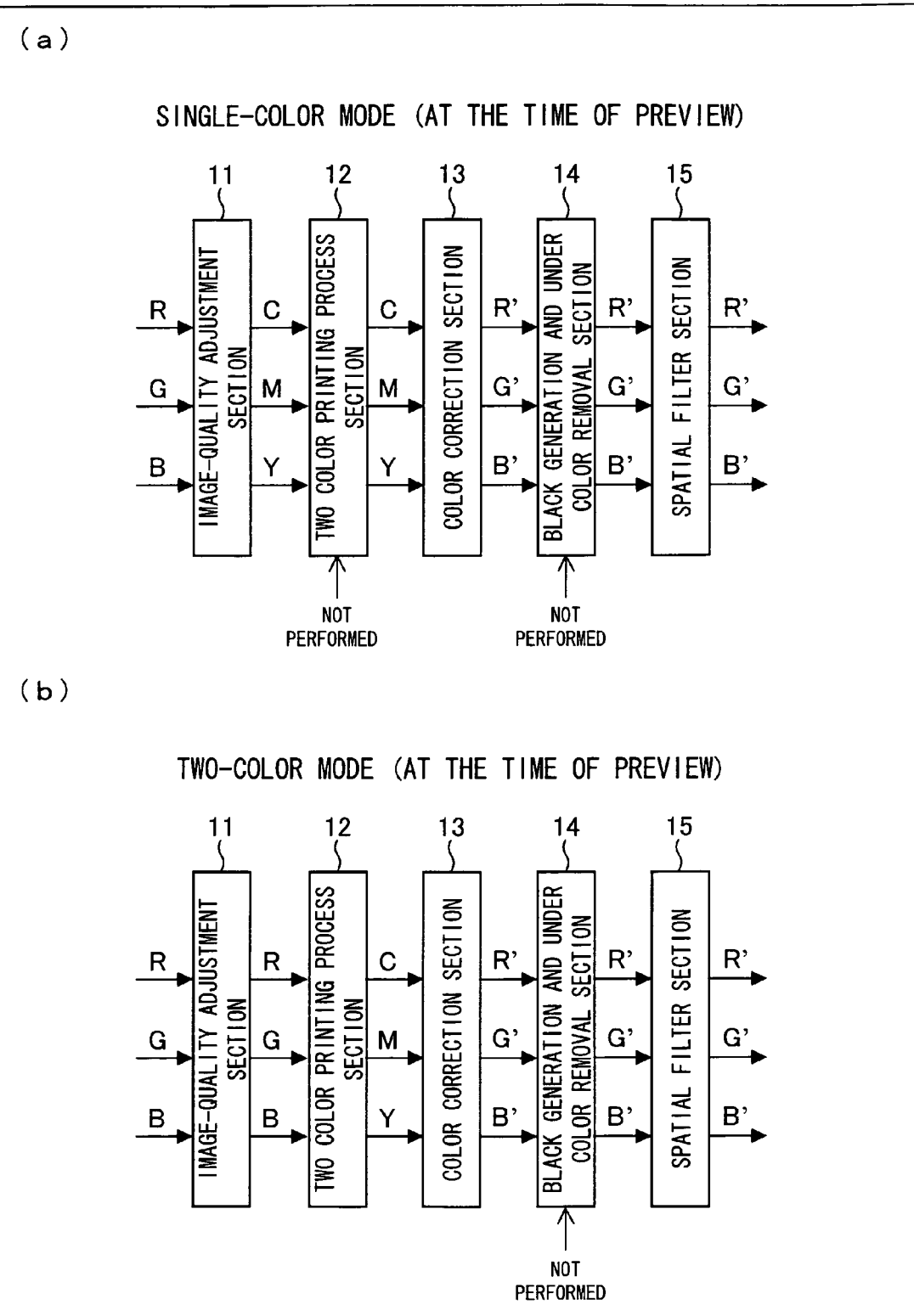
FIG. 4 shows block diagrams showing a part inside of the image processing apparatus (a) performing a preview display in the copier mode and the singe-color mode and (b) performing a preview display in the copier mode and the two-color mode.

As with FIG. 1, FIG. 3 shows the image forming apparatus 100 in the full-color mode. In the full-color mode, the color correction section 13 receives RGB image data. Meanwhile, in the single-color mode or two-color mode, as shown in FIG. 4, the color correction section 13 receives CMY image data. (a) of FIG. 4 shows some blocks of the image processing apparatus 2 performing a preview display in the copier mode and the singe-color mode, and (b) of FIG. 4 shows some blocks of the image processing apparatus performing a preview display in the copier mode and the two-color mode.

Then, in the single-color mode or two-color mode, the color correction section 13 converts the CMY image data into R'G'B' image data. That is, the color correction section 13 converts the CMY image data, which conform to the printing characteristics of the printing process, into the R'G'B' image data, which conform to the display characteristics of the display device. It should be noted that the conversion of the CMY image data into the R'G'B' image data is also realized by creating an LUT (look-up table) of input values (RGB) and output values (R'G'B') associated with one another and looking up the output values in the created LUT.

In any one of the single-color mode, the two-color mode, and the full-color mode, as shown in FIGS. 3 and 4, the black generation and under color removal section 14 performs no processing on the R'G'B' image data sent from the color correction section 13 and passes the image data directly on to the subsequent spatial filter section 15.

The spatial filter section 15 receives the R'G'B' image data from the black generation and under color removal section 14 and performs a spatial filter process (e.g., edge enhancement process, smoothing process) on the image data by a digital filter in accordance with the segmentation class signals. That is, as in the case of a printing process, the spatial filter section 15 executes image processing differently for each image area in accordance with the segmentation class signals.

The enlarging/reducing section 16 performs a downsampling process by which the number of pixels of an image composed of the R'G'B' image data sent from the spatial filter section 15 is converted into the number of pixels of the image display device 104 (process by which the number of pixels is reduced). The image display device 104, provided in the operation panel of the image forming apparatus 100, is lower in resolution than image data to be printed and, usually, is an extremely small display. Therefore, at the time of a preview display, it is necessary to downsample the image data. Further, the enlarging/reducing section 16 enlarges or reduces the image in accordance with an enlarging/reducing command (information indicating the zoom ratio of a display, e.g., a fixed zoom ratio of 2 to 4 times) inputted from the operation panel (not illustrated) provided in the image forming apparatus.

Figure 5:
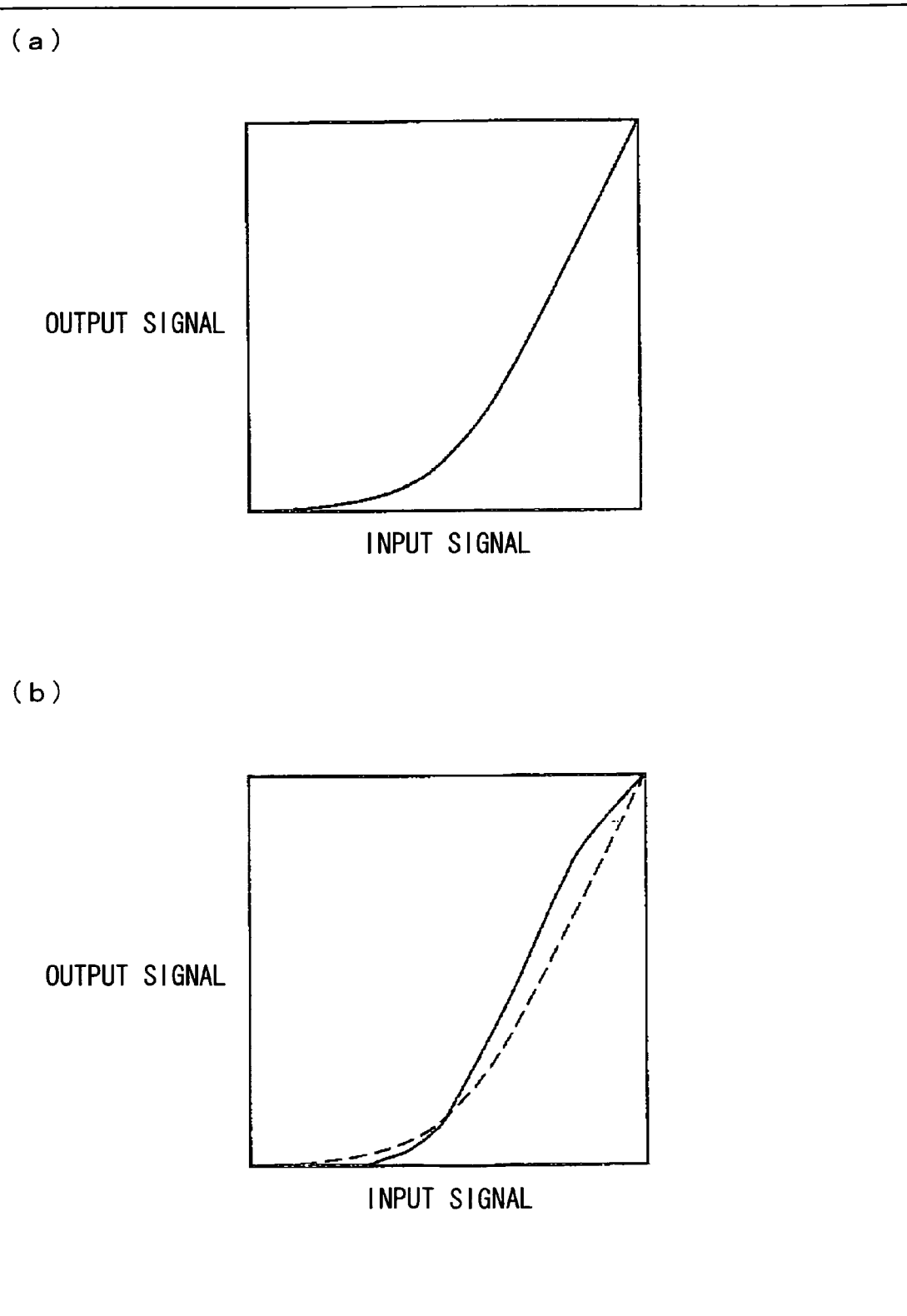
FIG. 5 shows gamma curves, i.e., (a) an example of a gamma curve corresponding to the display characteristics of an image display device and (b) a solid line representing a gamma curve for texts to be sharply displayed and a dotted line representing a gamma curve corresponding to the display characteristics of the image display device.

The output tone correction section 17 receives the image data from the enlarging/reducing section 16 and performs output gamma correction on the image data in accordance with the segmentation class signals. More specifically, in accordance with the segmentation class signals, the output tone correction section 17 selects different gamma curves for different image areas and varies in output gamma correction from one image area to another. For example, for nontext areas, the output tone correction section 17 selects a gamma curve corresponding to the display characteristics of the image display device 104, and for text areas, selects a gamma curve for texts to be sharply displayed. (a) of FIG. 5 shows a gamma curve corresponding to the display characteristics of the image display device 104, and (b) of FIG. 5 shows a solid line representing a gamma curve for texts to be sharply displayed and a dotted line representing a gamma curve corresponding to the display characteristics of the image display device 14. The dotted line is shown for comparison with the gamma curve for texts to be sharply displayed.

In the present embodiment, the output tone correction section 17 selects between the gamma curves in accordance with the segmentation class signals. However, the output tone correction section 17 may perform output tone correction by using only the gamma curve of (a) of FIG. 5, instead of making selection in accordance with the segmentation class signals.

Then, the halftone generation section 18 performs no processing on the R'G'B' image data sent from the output tone correction section 17 and passes the image data directly on to the subsequent image display device 104. This allows the image display device 104 to display, in accordance with the R'G'B' image data, a preview of an image to be copied.

It should be noted that in place of the output tone correction section 17, the image-quality adjustment section 11 may execute output gamma correction.

(1-3) As to Whether the Blocks Operate or do not Operate

As described above, at the time of printing in the full-color mode, the image-quality adjustment section 11 through the halftone generation section 18 all operate except for the two-color printing process section 12 (see FIG. 1). Meanwhile, at the time of a preview display in the full-color mode, the image-quality adjustment section 11 through the halftone generation section 18 all operate except for the two-color printing process section 12, the black generation and under color removal section 14, and the halftone generation section 18 (see FIG. 3).

Further, at the time of printing in the two-color mode, the image-quality adjustment section 11 through the halftone generation section 18 all operate except for the color correction section 13 (see (b) of FIG. 2). Meanwhile, at the time of a preview display in the two-color mode, the image-quality adjustment section 11 through the halftone generation section 18 all operate except for the black generation and under color removal section 14 and the halftone generation section 18 (see (b) of FIG. 4).

Furthermore, at the time of printing in the single-color mode, the image-quality adjustment section 11 through the halftone generation section 18 all operate except for the two-color printing process section 12, the color correction section 13, and the black generation and under color removal section 14 (see (a) of FIG. 2). Meanwhile, at the time of a preview display in the single-color mode, the image-quality adjustment section 11 through the halftone generation section 18 all operate except for the two-color printing process section 12, the black generation and under color removal section 14, and the halftone generation section 18 (see (a) of FIG. 4).

(1-4) Steps of a Process

Figure 6:
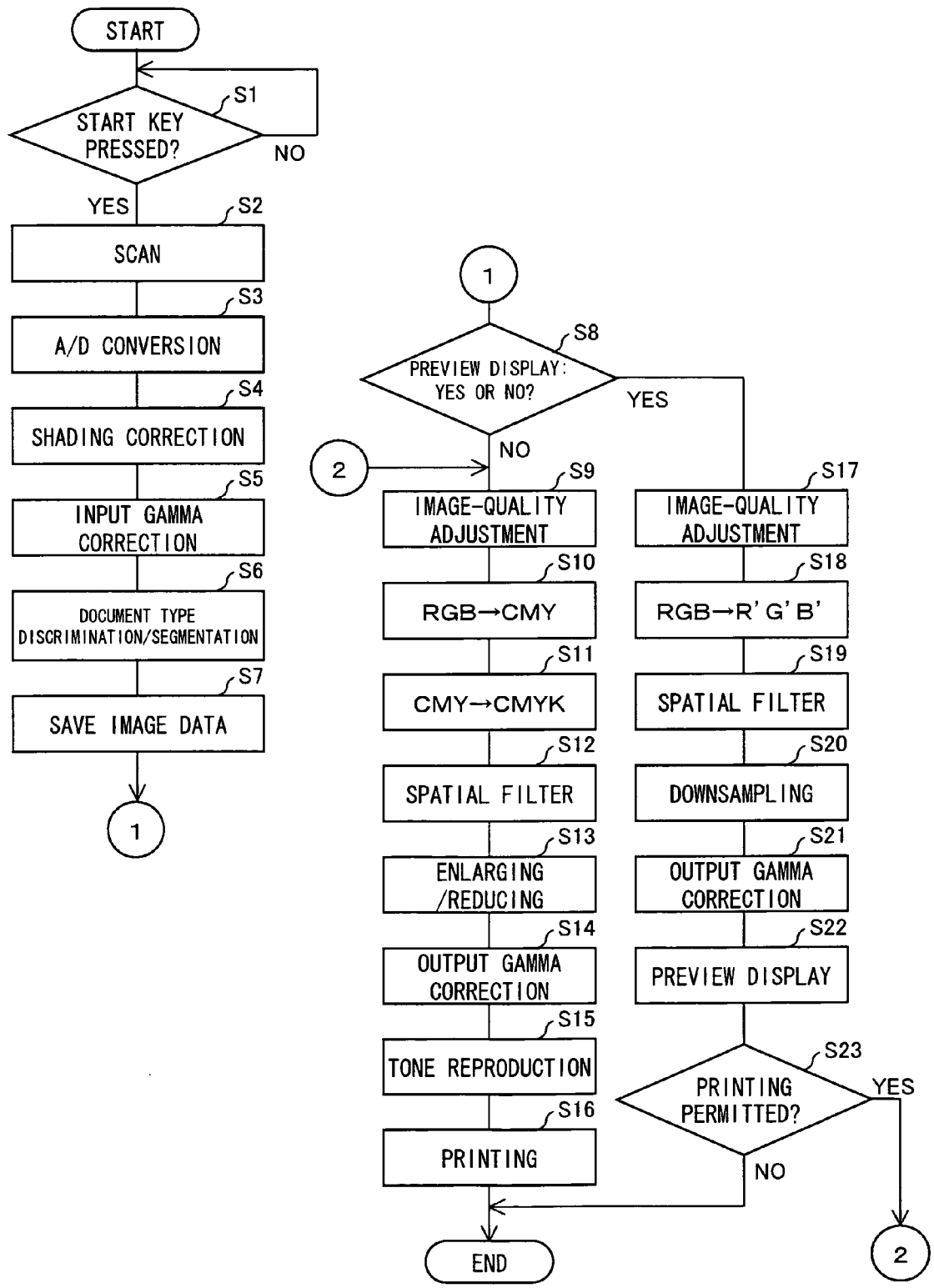
FIG. 6 is a flow chart showing steps of a process that is performed by the image forming apparatus in the copier mode and the full-color mode.

Next, an example of steps of a process in the copier mode and the full-color mode is described with reference to FIG. 6. FIG. 6 is a flow chart showing an example of steps of a process that is performed by the image forming apparatus in the copier mode and the full-color mode.

In response to a pressing of a start key (YES in S1) in the copier mode, the image forming apparatus 100 generates RGB analog signals by scanning a document (S2). It is assumed here that prior to the pressing of the start key in S1, the user inputs setting information indicating whether or not a preview display is necessary and thereby sets whether or not the image forming apparatus 100 performs a preview display.

After S2, the image forming apparatus 100 converts the RGB analog signals into RGB image data (digital data) (S3), subjects the RGB image data to shading correction (S4), and then subjects the RGB image data to input gamma correction (S5). After S5, the image forming apparatus 100 performs a document type discrimination process and a segmentation process in accordance with the RGB image data (S6), and then stores the RGB image in the storage device 107 (S7).

After S7, the image forming apparatus 100 judges whether or not it has been set to "Preview Display: Yes" (S8). In cases where it has not been set to "Preview Display: Yes", the image forming apparatus 100 executes Steps S9 through S16. In cases where it has been set to "Preview Display: Yes", the image forming apparatus 100 executes Steps S17 through S23. In the following, Steps S9 through S16 are described first, and then Steps S17 through S23 are described.

In cases where the image forming apparatus 100 has not been set to "Preview Display: Yes" (NO in S8), the image forming apparatus 100 reads out the RGB image data from the storage device 107, and then performs an image-quality adjustment process such as background removal correction and adjustment of intensity (S9). After that, the image forming apparatus 100 converts the RGB image data, which conforms to the characteristics of the scanner, into CMY image data conforming to the characteristics of the printer (S10), and then converts the CMY image data into CMYK image data (S11). After that, the image forming apparatus 100 performs a spatial filter process on the CMYK image data in accordance with a result of the segmentation process (S12), and then performs an enlarging/reducing process on the CMYK image data (S13). After S13, the image forming apparatus 100 performs output gamma correction and a tone reproduction process on the CMYK image data (S14, S15), prints an image of the image data on a sheet of paper (S16), and then finishes the process.

In cases where the image forming apparatus 100 judges, in S8, that it has been set to "Preview Display: Yes" (YES in S8), the image forming apparatus 100 reads out the RGB image data from the storage device 107, and then performs the same image-quality adjustment process as in S9 (S17). After that, the image forming apparatus 100 converts the RGB image data, which conforms to the characteristics of the scanner, into R'G'B' image data conforming to the characteristics of the display device (S18). After S18, the image forming apparatus 100 performs a spatial filter process on the R'G'B' image data in accordance with a result of the segmentation process (S19), and then performs a downsampling process on the R'G'B' image data so that the R'G'B' image data conforms to the resolution and size of the display (S20). After S20, the image forming apparatus 100 performs output gamma correction on the R'G'B' image data in accordance with the result of the segmentation process (S21). After S21, the image forming apparatus 100 performs a preview display in accordance with the R'G'B' image data (S22). Then, after S22, upon receiving, from the user, a command indicating permission of printing (YES in S23), the image forming apparatus 100 again reads out the RGB image data from the storage device 107, and then performs printing by executing Steps S9 through S16 in accordance with the image data. On the other hand, after S22, upon receiving, from the user, a command indicating cancellation of printing (NO in S23), the image forming apparatus 100 finishes the process.

(2) Facsimile Transmission Mode (2-1) Transmission Process (Image Transmission Job)

Figure 7:
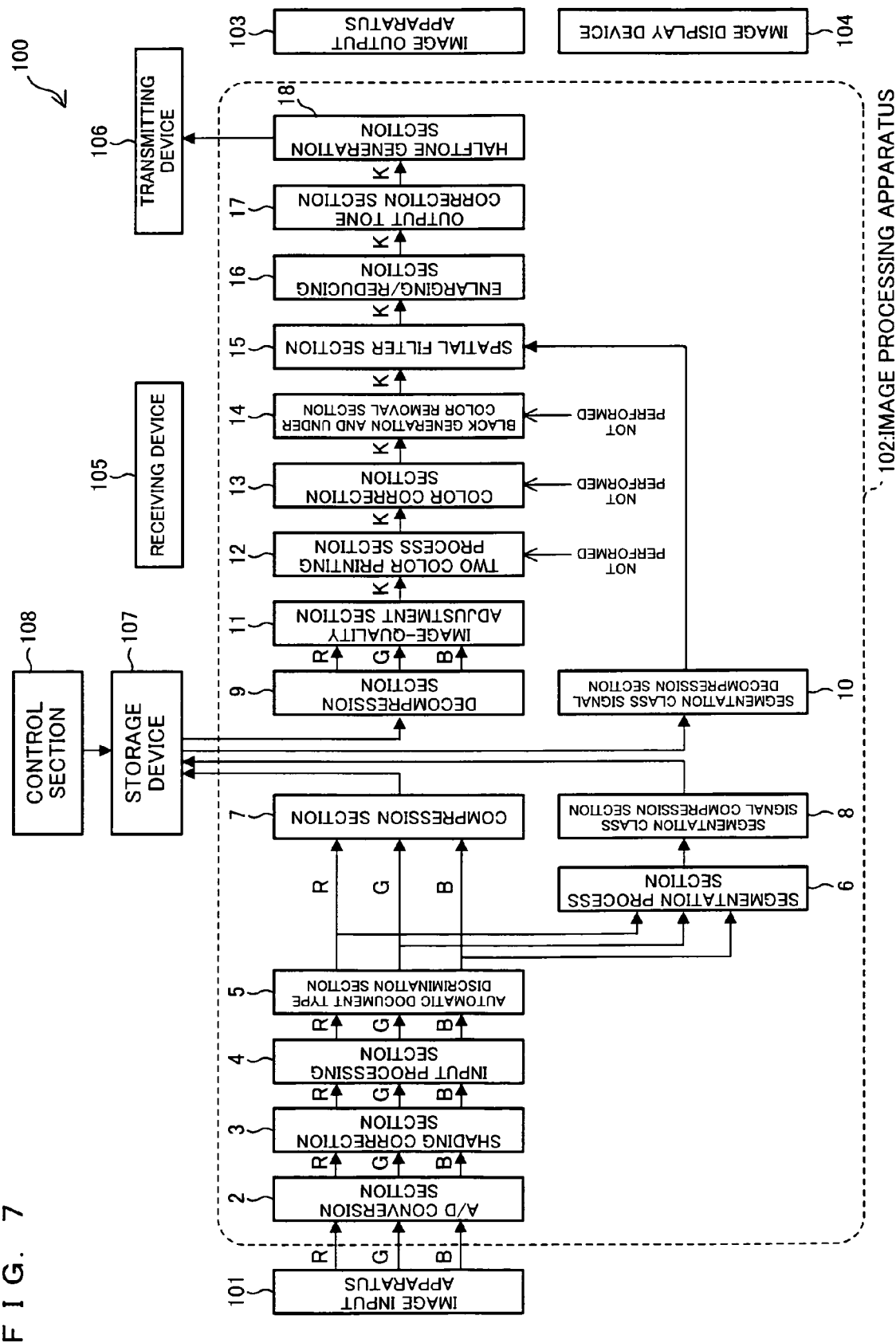
FIG. 7 is a block diagram showing the image forming apparatus of the present embodiment and showing the flow of image data in a transmission process in a facsimile transmission mode.

FIG. 7 is a block diagram showing the same image forming apparatus 100 as in FIG. 1 and showing the flow of image data in a transmission process in the facsimile transmission mode. It should be noted that because the A/D (analog/digital) conversion section 2, the shading process section 3, the input processing section 4, the automatic document type discrimination section 5, the segmentation process section 6, the compression section 7, the segmentation class signal compression section 8, and the decompression section 9 performs the same processes as in the case of the copier mode, such processes will not be described below.

In the facsimile transmission mode, the segmentation class signal decompression section 10 reads out the segmentation class signal codes from the storage device 107, decompresses the segmentation class signal codes, and then transmits the decompressed (decoded) segmentation class signal codes to the spatial filter section 15.

The image-quality adjustment section 11 receives the RGB image data from the decompression section 9 and converts the RGB image into K image data (a value indicating grayscale). It should be noted that this conversion is performed by using a predetermined matrix of coefficients and Eq. (2) below:

Luminance(Value of $K$ Image Data)=$0.299r+0.587g+0.114b$      Eq. (2)

where r is the value (density) of red image data, g is the value of green image data, and b is the value of blue image data.

The two-color printing process section 12, the color correction section 13, and the black generation and under color removal section 14 perform no processing on the K image data (signal) sent from the image-quality adjustment section 11 and pass the K image data directly on to the subsequent spatial filter section 15.

The spatial filter section 15 performs a spatial filter process (e.g., edge enhancement process, smoothing process) on the K image data by a digital filter in accordance with the segmentation class signals. The enlarging/reducing section 16 performs an enlarging/reducing process on the K image data in accordance with the transmission resolution. The output tone correction section 17 performs output gamma correction (gamma correction for output onto a recording medium such as a sheet of paper) on the K image data sent from the enlarging/reducing section 16. The halftone generation section 18 converts the K image data into binarized image data, for example, by error diffusion. Then, the binarized image data are rotated by a rotation process section (not shown) as needed, compressed by a compression/decompression section (not shown) into a predetermined form, and then stored in a memory (not shown).

After that, the transmitting device (e.g., modem) 106 performs a procedure for transmission to the destination and ensures transmittability to the destination. Then, the transmitting device 106 reads out the binarized image data, stored in the memory, with the binarized image data compressed in the predetermined form, subjects the binarized image data to necessary processes such as a conversion in compression format, and then transmits the binarized image data in sequence via a communication line.

(2-2) Preview Display

Figure 8:
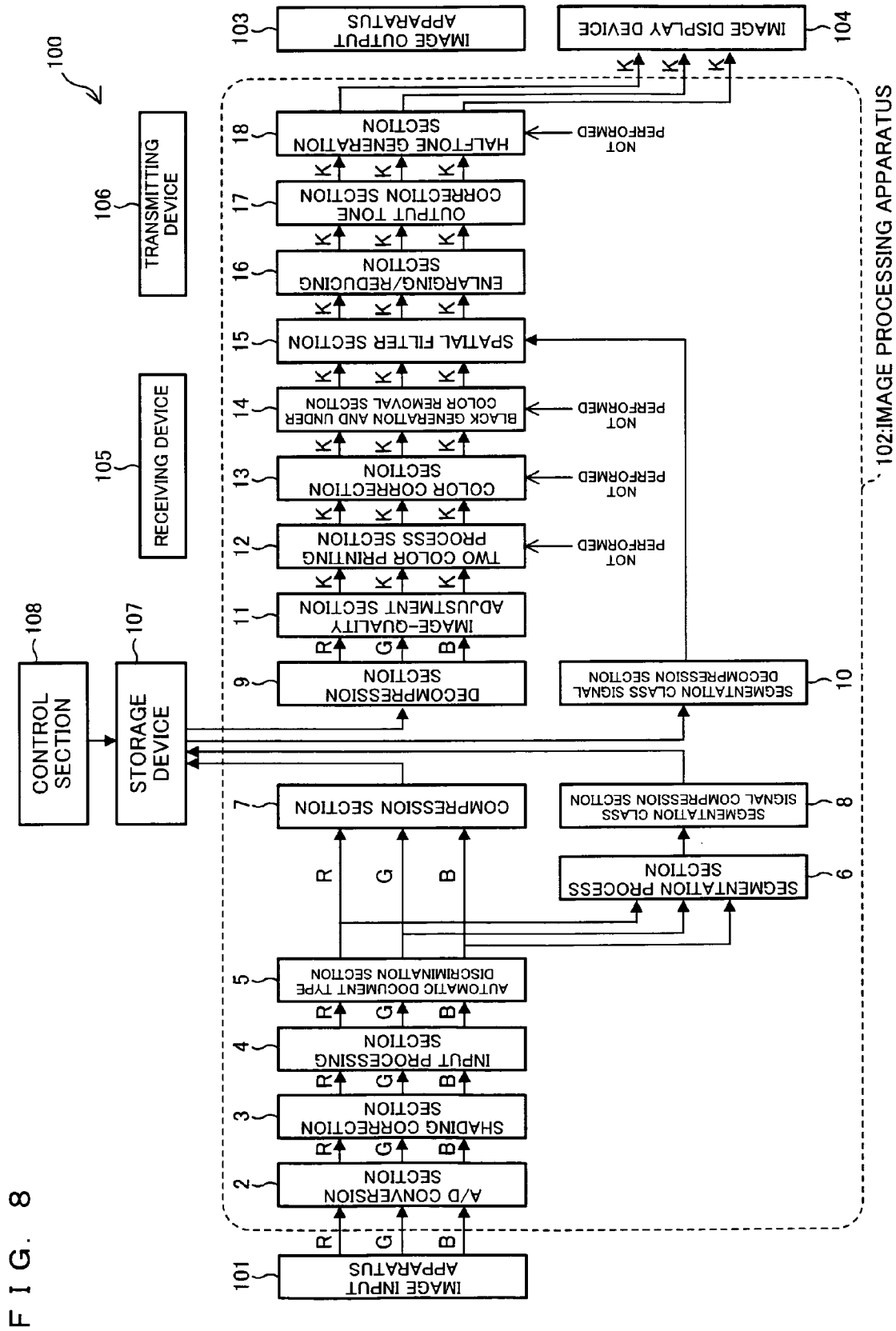
FIG. 8 is a block diagram showing the image forming apparatus of the present embodiment and showing the flow of image data in a preview display process in the facsimile transmission mode.

FIG. 8 is a block diagram showing the same image forming apparatus 100 as in FIG. 1 and showing the flow of image data in a preview display process in the facsimile transmission mode. The term "preview display in the facsimile transmission mode" here means a process of displaying a preview of an image to be transmitted by facsimile.

At the time of a preview display, the A/D conversion section 2, the shading correction section 3, the input processing section 4, the automatic document type discrimination section 5, the segmentation process section 6. the compression section 7, the segmentation class signal compression section 8, the decompression section 9, the segmentation class signal decompression section 10, the image-quality adjustment section 11, and the spatial filter section 15 perform the same processes as in the case of a facsimile transmission process; therefore, such processes are not described. Further, as in the case of a facsimile transmission process, the two-color printing process section 12, the color correction section 13, and the black generation and under color removal section 14 do not perform any processes.

However, at the time of a preview display, unlike in the case of a transmission process, as shown in FIG. 8, three pieces of K image data (all being equal in value) are transmitted for each pixel all the way from the image-quality adjustment section 11 to the image display device 104. This is because the image display device 104 is a full-color model and as such requires three values (pieces of image data) for one pixel.

The enlarging/reducing section 16 performs a downsampling process on the K image data so that the number of pixels of an image composed of the K image data sent from the spatial filter section 15 conforms to the number of pixels of the display size of the image display device 104. Further, the enlarging/reducing section 16 enlarges or reduces the image in accordance with an enlarging/reducing command (information indication the zoom ratio of a display, e.g., a fixed zoom ratio of 2 to 4 times) inputted from the operation panel (not shown) provided in the image forming apparatus 100.

The output tone correction section 17 receives the K image data from the enlarging/reducing section 16 and performs gamma correction on the K image data in conformity to the display characteristics of the image display device 104. Then, the halftone generation section 18 performs no processing on the K image data sent from the output tone correction section 17 and passes the K image data directly on to the subsequence image display device 104. This allows the image display device 104 to display, in accordance with the K image data, a preview of an image to be transmitted by facsimile.

Further, at the time of a preview display process in the facsimile transmission mode, the image-quality adjustment section 11 converts the RGB image data into three pieces of K image data. However, there is no such limitation in embodiment. For example, it is possible to perform image processing without converting RGB image data into K image data up to the output tone correction section 17, to receive the RGB image data from the output tone correction section 17, and to convert the RGB image data into K image data by a browser.

(2-3) As to Whether the Blocks Operate or do not Operate

As described above, at the time of a transmission process in the facsimile transmission mode, the image-quality adjustment section 11 through the halftone generation section 18 all operate except for the two-color printing process section 12, the color correction section 13, and the black generation and under color removal section 14 (see FIG. 7). Meanwhile, at the time of a preview display in the facsimile transmission mode, the image-quality adjustment section 11 through the halftone generation section 18 all operate except for the two-color printing process section 12, the color correction section 13, the black generation and under color removal section 14, and the halftone generation section 18 (see FIG. 8).

(2-4) Steps of a Process

Next, an example of steps of a process in the facsimile transmission mode is described. In cases where the image forming apparatus 100 receives a fax transmission command from the user with the image forming apparatus 100 having not been set to "Preview Display: Yes", the image forming apparatus 100 processes image data as shown in FIG. 7 and transmits the image data to an external apparatus.

Meanwhile, in cases where the image forming apparatus 100 receives a fax transmission command from the user with the image forming apparatus 100 set to "Preview Display: Yes", the image forming apparatus 100 processes image data as shown in FIG. 8, thereby storing the image data in the storage device 107 and displaying a preview of an image of the image data on the image display device 104. Then, when the image forming apparatus 100 receives a transmission permission command from the user with the preview being displayed, the image forming apparatus 100 reads out the image data from the storage device 107, processes the image data in the decompression section 9 through the halftone generation section 18 as shown in FIG. 7, and transmits the image data to an external apparatus via the transmitting device 106.

(3) Facsimile Reception Mode (3-1) Printing Process (Image Print Job)

Figure 9:
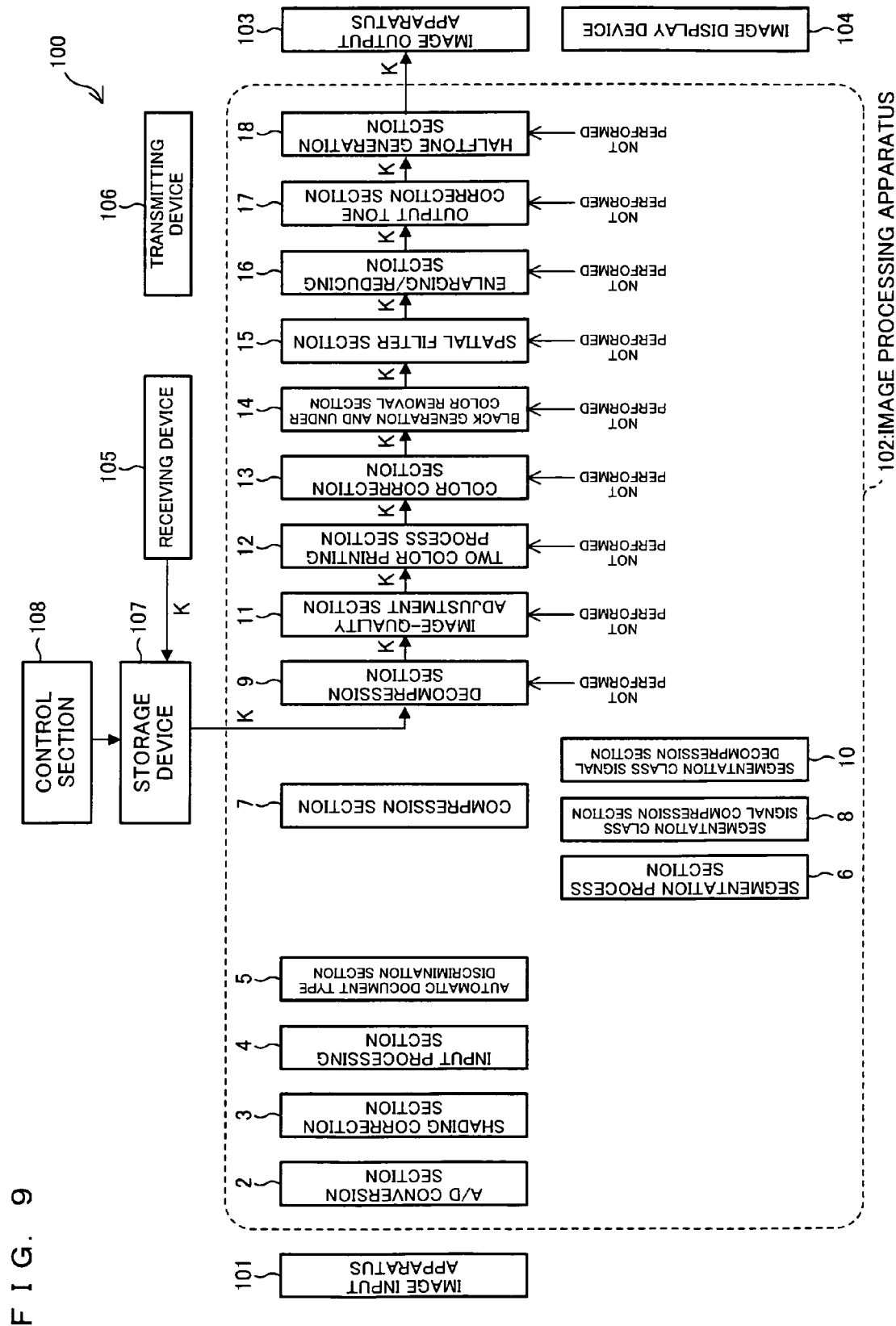
FIG. 9 is a block diagram showing the image forming apparatus of the present embodiment and showing the flow of image data in a printing process in a facsimile reception mode.

FIG. 9 is a block diagram showing the same image forming apparatus 100 as in FIG. 1 and showing the flow of image data in a printing process in the facsimile reception mode.

In the case of facsimile reception, the receiving device 105 receives K image data (1 bit) from the source while performing a communication procedure. Then, the K image data received by the receiving device 105 are decompressed by the compression/decompression section (not shown), rotated by the rotation process section (not shown) as needed, and then subjected to a resolution conversion process by a resolution conversion section (not shown). After that, the image data are stored temporarily in the storage device 107.

Furthermore, the image data written in the storage device 107 are passed on to the decompression section 9 of the image processing apparatus 102 by the control section 108. The decompression section 9, the image-quality adjustment section 11, the two-color printing process section 12, the color correction section 13, the black generation and under color removal section 14, the spatial filter section 15, the enlarging/reducing section 16, the output tone correction section 17, and the halftone generation section 18 perform no processing on the image data sent from the storage device 107 and pass the image data directly onto the subsequent image output apparatus 103. The image output apparatus 103 forms an image on a recording medium (e.g., a sheet of paper) in accordance with the K image data sent from the halftone generation section 18. In the case of a printing process in the facsimile reception mode, image processing is not performed as described above. Therefore, the image data stored in the storage device 107 may be outputted directly to the image output apparatus 103.

(3-2) Preview Display

Figure 10:
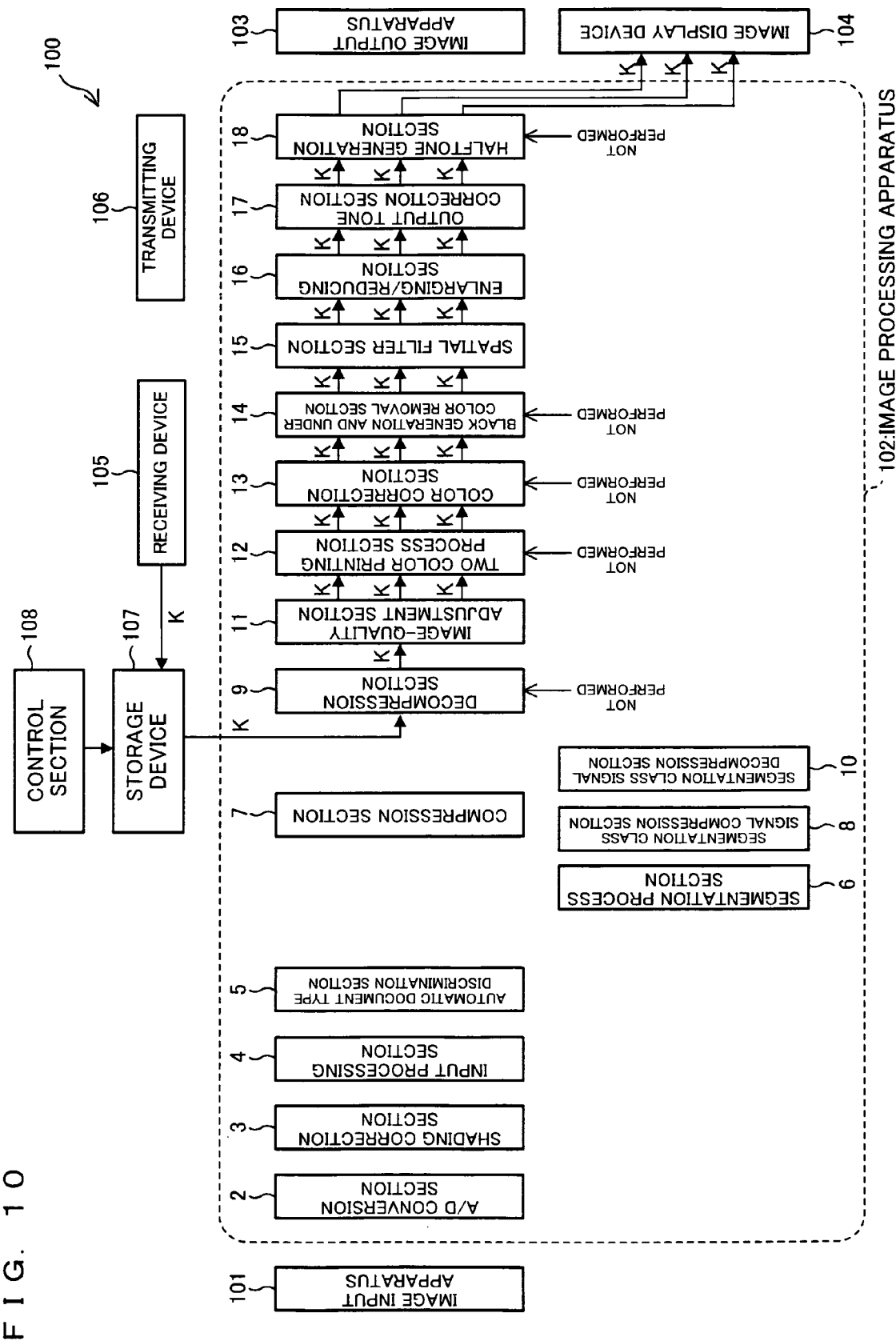
FIG. 10 is a block diagram showing the image forming apparatus of the present embodiment and showing the flow of image data in a preview display process in the facsimile reception mode.

FIG. 10 is a block diagram showing the same image forming apparatus 100 as in FIG. 1 and showing the flow of image data in a preview display process in the facsimile reception mode. The term "preview display in the facsimile reception mode" here means a process of, before printing an image of image data received by facsimile, displaying a preview of the image to be printed.

Also at the time of a preview display in the facsimile reception mode, as in the case of a printing process in the facsimile reception mode, the image data written in the storage device 107 are passed on to the decompression section 9 of the image processing apparatus 102 by the control section 108. The decompression section 9 performs no processing on the image data sent from the storage device 107 and passes the image data on to a bit-number conversion process section (not shown). Then, the bit-number conversion process section converts the number of bits of the image data sent from the decompression section 9 (e.g., from 1 bit to 8 bits), and then passes the image data on to the image-quality adjustment section 11. That is, although not shown in FIG. 10, the decompression section 9 and the image-quality adjustment section 11 has the bit-number conversion section provided therebetween.

As shown in FIG. 10, for each pixel, the image-quality adjustment section 11 receives one piece of K image data and generates and outputs three pieces of K image data (all being equal in value). This is because the image display device 104 is a full-color model and as such requires three values for one pixel.

After that, the two-color printing process section 12, the color correction section 13, and the black generation and under color removal section 14 perform no processing on the K image data sent from the image-quality adjustment section 11 and pass the image data directly on the subsequent spatial filter section 15. The spatial filter section 15 performs a blur (smoothing) process and the like on the K image data with use of a digital filter.

The enlarging/reducing section 16 performs a downsampling process on the K image data so that the number of pixels of an image of the K image data sent from the spatial filter section 15 conforms to the number of pixels of the display size of the image display device 104. Further, the enlarging/reducing section 16 enlarges or reduces the image in accordance with an enlarging/reducing command (information indication the zoom ratio of a display, e.g., a fixed zoom ratio of 2 to 4 times) inputted from the operation panel (not shown) provided in the image forming apparatus 100.

The output tone correction section 17 receives the K image data from the enlarging/reducing section 16 and performs output gamma correction on the K image data in conformity to the display characteristics of the image display device 104. Then, the halftone generation section 18 performs no processing on the K image data sent from the output tone correction section 17 and passes the K image data directly on to the subsequence image display device 104. This allows the image display device 104 to display, in accordance with the K image data, a preview of an image received by facsimile.

(3-3) As to Whether the Blocks Operate or do not Operate

As described above, at the time of a printing process in the facsimile reception mode, the image-quality adjustment section 11 through the halftone generation section 18 do not operate (see FIG. 9). Meanwhile, at the time of a preview display in the facsimile reception mode, the image-quality adjustment section 11 through the halftone generation section 18 all operate except the two-color printing process section 12, the color correction section 13, the black generation and under color removal section 14, and the halftone generation section 18 (see FIG. 10).

(3-4) Steps of a Process

Next, an example of steps of a process in the facsimile reception mode is described. In cases where the image forming apparatus 100 receives image data by facsimile, the received image data are written temporarily in the storage device 107. It should be noted here that there is a time lag between the writing of the image data in the storage device 107 and printing of an image. In cases where the user inputs a "preview command" during the time lag, the image data is processed along such a flow as shown in FIG. 10, and a preview of an image of the image data is displayed by the image display device 104. Further, when the image is printed, the image data is processed along such a flow as shown in FIG. 9, and the image of the image data is printed by the image output apparatus 103.

(4) Image Transmission Mode (4-1) Transmission Process (Image Transmission Job)

In the case of operation of the image forming apparatus 100 at the time of a transmission process in the image transmission mode, the image input apparatus 101, the A/D (analog/digital) conversion section 2, the shading correction section 3, the input processing section 4, the automatic document type discrimination section 5, the segmentation process section 6, the compression section 7, the segmentation class signal compression section 8, and the decompression section 9 performs the same processes as in the case of the copier mode. It should be noted that the segmentation class signal decompression section 10 supplies the segmentation class signals to the spatial filter section 15 and the output tone correction section 17.

Then, the image-quality adjustment section 11 performs a background removal process and color balance adjustment. The color correction section 13 converts the image data into R"G"B" image data (e.g., sRGB data) conforming to the display characteristics of a commonly-used display device. The spatial filter section 15 performs a spatial filter process (edge enhancement process, smoothing process) by a digital filter in accordance with the segmentation class signals. The enlarging/reducing section 16 enlarges or reduces the image. Further, the output tone correction section 17 performs correction on a text area with use of the gamma curve of (b) of FIG. 5, and performs correction on a nontext area with use the gamma curve of (a) of FIG. 5, for example. The two-color printing process section 12 and the black generation and under color removal section 14 perform no processing on the input image data, and each of the blocks passes the image data directly on to the subsequent block. Therefore, the output tone correction section 17 outputs the R"G"B" image data.

Furthermore, the R"G"B" image data from the output tone correction section 17 are converted into an image file such as a PDF file by a format conversion process section (not shown). Then, in the scan to e-mail mode, which is an image transmission mode, the image file is attached to an e-mail by the mail processing section (job apparatus; not shown), and the e-mail is transmitted to the destination via a network. Alternatively, in the scan to ftp mode, which is another image transmission mode, the image file is transmitted to a predetermined folder. Alternatively, in the scan to usb mode, which is the other image transmission mode, the image file is transmitted to a predetermined USB memory.

(4-2) Preview Display

In the case of operation of the image forming apparatus 100 at the time of a preview display in the image transmission mode, the image input apparatus 101, the A/D (analog/digital) conversion section 2, the shading correction section 3, the input processing section 4, the automatic document type discrimination section 5, the segmentation process section 6, the compression section 7, the segmentation class signal compression section 8, the decompression section 9, the segmentation class signal decompression section 10, the image-quality adjustment section 11, and the two-color printing process section 12 perform the same processes as in the case of transmission in the image transmission mode.

Then, at the time of a preview display in the image transmission mode, the color correction section 13 converts the RGB image data into R'G'B' image data conforming to the color space of the image display device 104.

After that, as in the case of transmission, the spatial filter section 15 performs a spatial filter process (edge enhancement process, smoothing process) by a digital filter in accordance with the segmentation class signals. The enlarging/reducing section 16 performs a downsampling process for a match in size for the image display device 104. Further, the output tone correction section 17 performs correction on a text area with use of the gamma curve of (b) of FIG. 5, and performs correction on a nontext area with use the gamma curve of (a) of FIG. 5, for example.

Then, the output tone correction section 17 supplies the R'G'B' image data to the image display device 104, and the image display device 104 performs a preview display in accordance with the R'G'B' image data.

(5) Modification

Figure 11:
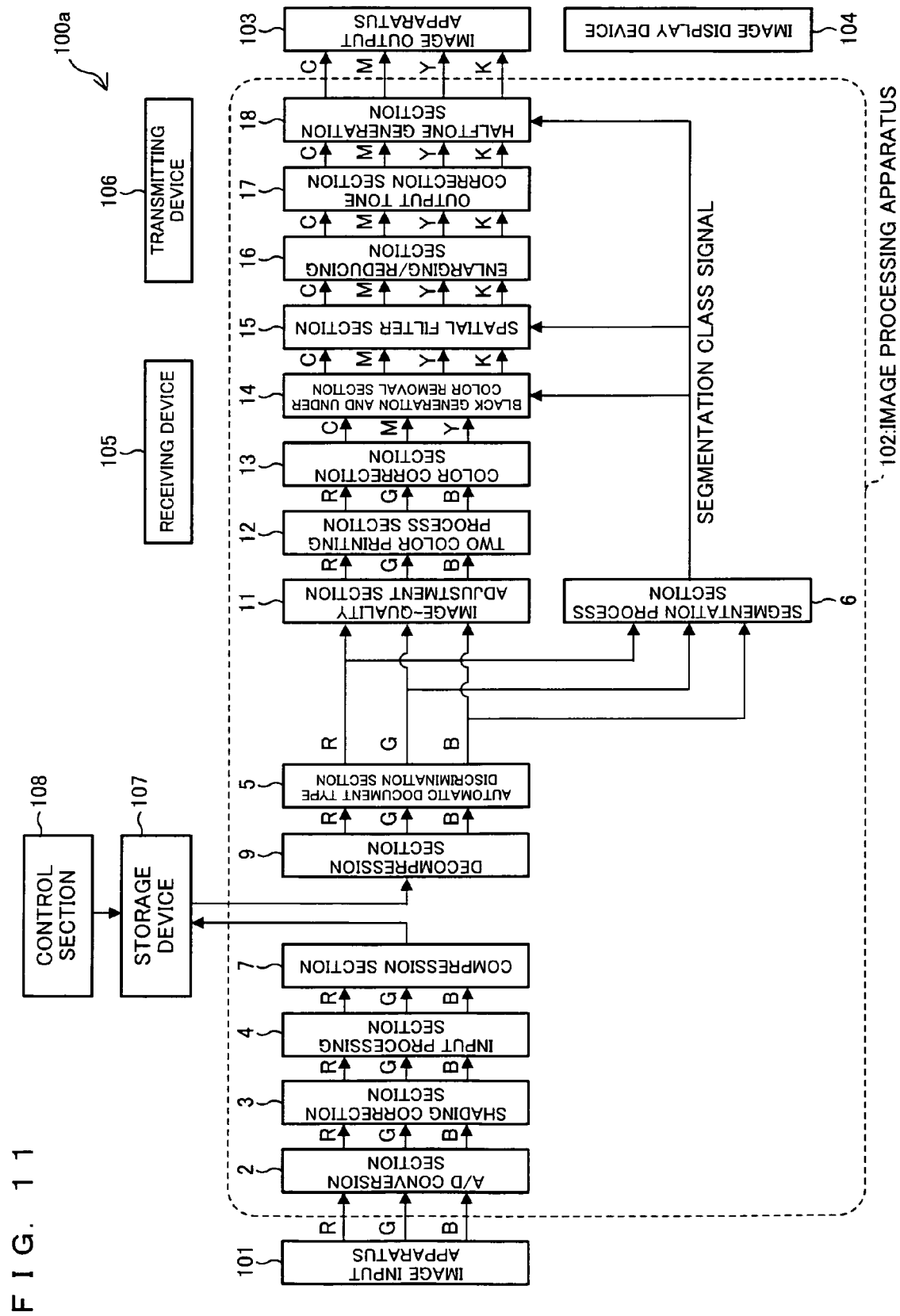
FIG. 11 is a block diagram showing a modification of the image forming apparatus of the present embodiment.

In the image forming apparatus 100 of FIG. 1, the compressed image data (encoded codes) and the segmentation class signal codes are stored in the storage device 107 in association with one another. However, as in an image forming apparatus 100a of FIG. 11, there may be such an arrangement that: after the image input apparatus 101 reads image data, the image data are encoded and stored temporarily in the storage device 107 before a segmentation process and an automatic document type discrimination process; and the image data are read out from the storage device 107, decompressed, and then subjected to a segmentation process and an automatic document type discrimination process.

Further, the image forming apparatus 100 of FIG. 1 may be capable of executing an image filing mode (image filing job) during a job such as the copier mode, the printer mode, the facsimile transmission mode, the facsimile reception mode, or the image transmission mode. The image filing mode is a mode in which to create an image file (e.g., JPEG or TIFF file), during a job such as the copier mode, in accordance with image data obtained by the image input apparatus 101 or image data received from outside and store the image file in the storage device 107.

At the time of filing in the image filing mode, the image data obtained by the image input apparatus 101 or the image data received from outside are converted into an image file (e.g., JPEG or TIFF file) by the image processing apparatus 102. The image filed is sent to a filing processing section (job apparatus; not shown). The filing processing section stores the image file in the storage device 107.

Further, in the case of a preview during each job (e.g., the copier mode, the print mode, or the facsimile transmission mode), the image data obtained by the image input apparatus 101 or the image data received from outside are processed by the image processing apparatus 102, and then sent to the image display device 104, regardless of the execution of the image filing mode. Furthermore, in the case of a preview during each job, the image processing apparatus 102 executes the same image processing regardless of the execution of the image filing mode. For example, at the time of a preview display in the copier mode, the image processing apparatus 102 performs such processes as shown in FIG. 3, regardless of the execution of the image filing mode. Further, at the time of a preview display in the facsimile transmission mode, the image processing apparatus 102 performs such processes as shown in FIG. 8, regardless of the execution of the image filing mode.

(6) Advantages of the Image Processing Apparatus of the Present Embodiment

The image processing apparatus 102 of the present embodiment supplies image data to the image output apparatus (job apparatus, printing apparatus) 103, which performs a print job (copier mode, print mode), and supplies the image data to the image display device 104 so that the image display device 104 displays a preview before the execution of the print job.

Moreover, the image processing apparatus 102 includes a first image processing section which performs first image processing on image data to be supplied to the image output apparatus 103, which performs second image processing on image data to be supplied to the image display device 104, the second image processing being different from the first image processing, and which performs the first image processing and the second image processing with use of a common circuit area. An example of the first image processing section is the color correction section 13 in the copier mode and the full-color mode. This is because the color correction section 13 uses a common circuit area for a process of conversion from RGB into CMY (first image processing) and a process of conversion from RGB into R'G'B' (second image processing).

This brings about a merit of reducing the circuit size of an image processing circuit even in an image processing apparatus that performs image processing for a printing process or the like and image processing for a preview before the printing process.

Further, in the present embodiment, at the time of printing in the copier mode and the full-color mode, the color correction section 13 performs a process by which additive image data (RGB) read by the scanner and conforming to the characteristics of the scanner are converted into subtractive image data (CMY) conforming to the characteristics of the image output apparatus 103. Meanwhile, at the time of a preview in the copier mode and the full-color mode, the color correction section 13 performs a process by which the additive image data (RGB) read by the scanner and conforming to the characteristics of the scanner are converted into additive image data (R'G'B') conforming to the characteristics of the image display device 104. That is, at the time of a preview display, the additive image data conforming to the characteristics of the scanner are converted directly into the image data conforming to the characteristics of the image display device 104. Therefore, at the time of a preview display in the copier mode and the full-color mode, the image processing apparatus 102 of the present embodiment performs a single nonlinear conversion from the RGB image data into the R'G'B' image data, but does not perform a plurality of nonlinear conversions as in the arrangement of Japanese Patent Application Publication, Tokukaihei, 9-135316 A (1997), thus making it possible to suppress accumulation of errors in conversion and suppress deterioration in color reproducibility. In Japanese Patent Application Publication, Tokukaihei, 9-135316 A (1997), a total of four conversions are performed, namely the conversion from RGB data into CMY data, the conversion from CMY data into CMYK data, the conversion from CMYK data into CMY data, and the conversion from the CMY data into RGB data, which result in accumulation of errors in conversion and deterioration in color reproducibility.

Further, at the time of a preview in the copier mode and the single-color mode or at the time of a preview in the copier mode and the two-color mode, the present embodiment performs such a nonlinear conversion, but the number of such nonlinear conversions is only two. Therefore, it is possible to better suppress deterioration in color reproducibility than in the arrangement of Japanese Patent Application Publication, Tokukaihei, 9-135316 A (1997), in which a total of four nonlinear conversions are performed.

Furthermore, in the present embodiment, at the time of printing in the copier mode and the full-color mode, the black generation and under color removal section 14 converts CMY image into CMYK image data; meanwhile, at the time of a preview display in the copier mode and the full-color mode, the black generation and under color removal section 14 performs no processing on R'G'B' and outputs R'G'B' directly. This makes it possible to simplify the circuit arrangement by using a common image data path in the image processing circuit for printing image data that needs to be converted from CMY into CMYK and preview image data that does not need to be subjected to a black generation and under color removal process.

The image processing apparatus 102 of the present embodiment can perform image processing based on a result of judgment by the automatic document type discrimination section 5, image processing based on a result of processing by the segmentation process section 6, and a background removal process. The effects of these processes are reflected in a preview image that is displayed by the image display device 104.

Embodiment 2

In the present embodiment, a process of displaying a preview in which a blank document is skipped is performed. Therefore, a blank document is not displayed in a preview. The blank document (a blank page document, a solid-color document) here means a document on which no image is formed regardless whether a background is colored or white. A configuration of an image forming apparatus of the present embodiment is the same as the configuration of an image forming apparatus 100 of Embodiment 1. Because the image forming apparatus of the present embodiment performs the same process as the image forming apparatus 100, members of the image forming apparatus of the present invention is given the same reference numerals as those of the image forming apparatus 100.

(Configuration of Automatic Document Type Discrimination Section)

In the present embodiment, detection of a blank document is performed regardless of mode settings (mode selection) such as a setting of a color mode (selection from a full-color mode, a single-color mode, and a two-color mode, a result of color/monochrome determination), a setting of color scanning/black-and-white scanning (selection of a start button), and a setting of a blank page skip mode. For detecting a blank document, regarding image data (input image data) that is image data of a document scanned by the image input apparatus 101 and inputted into an image processing apparatus 102 from the image input apparatus (document scanning apparatus) 101, it is determined whether or not the input image data is image data of a blank document.

A process of determining a blank document is performed by an automatic document type discrimination section 5. As shown in FIG. 12, the automatic document type discrimination section 5 includes a document type determination section 51, a color/monochrome determination section 52, and a blank document determination section 53.

The document type determination section 51 determines which one of, for example, a text document, a printed-picture (printed-photograph) document, a photograph document, a text/printed-picture document, and a text/photograph document the document read by the image input apparatus 101 corresponds to. A result of the determination is outputted as a document type determination signal.

The color/monochrome determination section 52 determines whether the document scanned by the image input apparatus 101 is a color document or a black-and-white document. A result of the determination is outputted as a color/monochrome determination signal.

The blank document determination section 53 determines whether or not the image data (input image data) that is the image data of the document scanned by the image input apparatus 101 and inputted into an image processing apparatus 102 from the image input apparatus 101 is image data of a blank document. Here, it is determined whether or not the document scanned by the image input apparatus 101 is a blank document (blank color document (solid-color document), inclusive). A result of the determination is outputted as a blank document determination signal. The blank document determination section 53 adds a tag (blank document determination signal) to the image data that is scanned by the image input apparatus 101 and determined to be a blank document. An example of a method of determining a blank document is explained later.

Accordingly, the document type determination signal, the color/monochrome determination signal, and the blank document determination signal are added to RGB image data outputted from the automatic document type discrimination section 5. Alternatively, (i) document type discrimination signals arranged to include a blank document determination signal as one signal and (ii) a color/monochrome determination signal may be added to the RGB image data.

In the present embodiment, a static sheet scanning mode and a sheet-feed scanning mode are provided as scanning modes in which to read a document by the image input apparatus 101. In the static sheet scanning mode, a document is not fed while a document image is scanned. As described in an explanation of the image input apparatus 101 below, this mode includes a case where scanning is performed on a document that is not set in a document setting tray (in a state where a document is not detected by a document setting detection sensor), that is, a case where scanning is performed on a document placed on a scanner platen. In the sheet-feed scanning mode, a document is kept being fed while an image is scanned. As described in the explanation of the image input apparatus 101 below, this sheet-feed scanning mode includes a case where scanning is carried out on a document that is set on the document setting tray (in a state where a document is detected by the document setting detection sensor, or, when a duplex scanning mode is selected through an operation panel).

In both of these scanning modes, the detection of a blank document may be performed. Alternatively, the detection of a blank document may be carried out only in the case of the sheet-feed scanning mode. A reason for this is that, in the static sheet scanning mode, a user sets documents sheet by sheet on the platen and may check each document. Accordingly, a possibility of scanning a blank document is low. On the other hand, in the sheet-feed scanning mode, documents are automatically fed and a user may not check documents each time a document is fed. Accordingly, a possibility of scanning a blank document is high. Therefore, a process can be carried out effectively if the detection of a blank document is carried out in the sheet-feed scanning mode.

The image data on which the detection of a blank document is carried out is stored in a storage device 107. When the image data is stored in the storage device 107, a tag indicative of a blank document is added to the image data determined to be a blank document among the image data on which the detection is carried out. In the present embodiment, a control section (preview control section) 108 reads out the input image data from the storage device 107. When the input image data is read out from the storage device 107 and the image display device 104 displays a preview, the control section (preview control section) 108 excludes the input image data determined as image data of a blank document by the blank document determination section 53, that is, the image data to which the tag indicative of the blank document is added, from the images to be displayed by the image display device 104.

(Blank Document Determination)

Next, a method of determining a blank document is explained. For example, the following methods (1) to (8) described in Japanese Patent Application, Tokugan, No. 2007-264922 (Japanese Patent Application Publication, Tokukai, No. 2009-94903) can be used as the determination method.

(1) Calculate, for respective RGB planes (respective color components), average values (average pixel values) of each block (e.g., 7×7 pixels) made of a plurality of pixels including a processing pixel (target pixel, pixel of interest), and define the average values as pixel values of the processing pixel.

(2) Calculate, for respective RGB planes (respective color components), maximum density differences of each block (e.g., 7×7 pixels) made of a plurality of pixels including a processing pixel. Then, compare each of the maximum density differences with an edge determination threshold, and determine whether or not the processing pixel of the block belongs to an edge pixel. That is, in a case where any one of the maximum density differences of the plurality of color components is equal to or greater than the edge determination threshold (e.g., 30), the processing pixel is determined to be an edge pixel. A method of determining an edge may be such that the processing pixel is determined to be an edge pixel when a variance value is calculated in addition to the maximum density difference and the variance value is equal to or more than a threshold.

(3) Count the pixels determined to be the edge pixels in (2).

(4) Compare the average values of the respective planes (respective color components) of the processing pixel calculated in (1). For each processing pixel, obtain a maximum value and a minimum value of the average values of the respective color components. Make respective histograms for the maximum value and difference between the maximum value and the minimum value (hereinafter, referred to as maximum difference).

(5) If the number of edge pixels counted is greater than a first determination threshold, a text area or a halftone dot area is present and it is determined that the document is not a blank document.

(6) If the number of edge pixels counted is equal to or less than the first determination threshold (e.g., 5000), the document is determined to be a blank document or a photograph document.

(7) In a case where the document is determined to be a blank document or a photograph document, obtain a total value of the number of bins each having a frequency-of-occurrence value greater than a second determination threshold (e.g., 500) for each of the histograms for the maximum value and the maximum difference of the average values for the respective color components. The total value for the histogram for the maximum value is defined as a maximum-value-histogram document density width, and the total value for the histogram of the maximum differences is defined as a maximum-difference-histogram document density width.

(8) If each of the maximum-value-histogram document density width and the maximum-difference-histogram document density width is less than a third determination threshold (e.g., 3), the document is determined to be a blank document.

According to the above method, an edge pixel is determined. However, without determining an edge pixel, whether or not a document is a blank document may be determined with use of the average values of the respective color components for respective blocks, that is, (i) obtaining the maximum value and the maximum difference of the average values of respective color components, and (ii) making respective histograms for the maximum value and the maximum difference. In this case, in addition to the determination of the maximum-value-histogram document density width and the maximum-difference-histogram document density width, the number of the maximum-difference-histogram document density widths (number of density bins) is obtained. If each of the maximum-value-histogram document density width and the maximum-difference-histogram document density width is smaller than the third threshold value (e.g., 3) and the number of the maximum-difference-histogram document density widths is 1, the document is determined to be a blank document.

Note that a method of determining a blank document is not limited to the above method. For example, a blank document may be determined by counting the numbers of respective pixels of black pixels and white pixels and performing threshold processing on values of the counted numbers.

(Preview Display)

Figure 13:
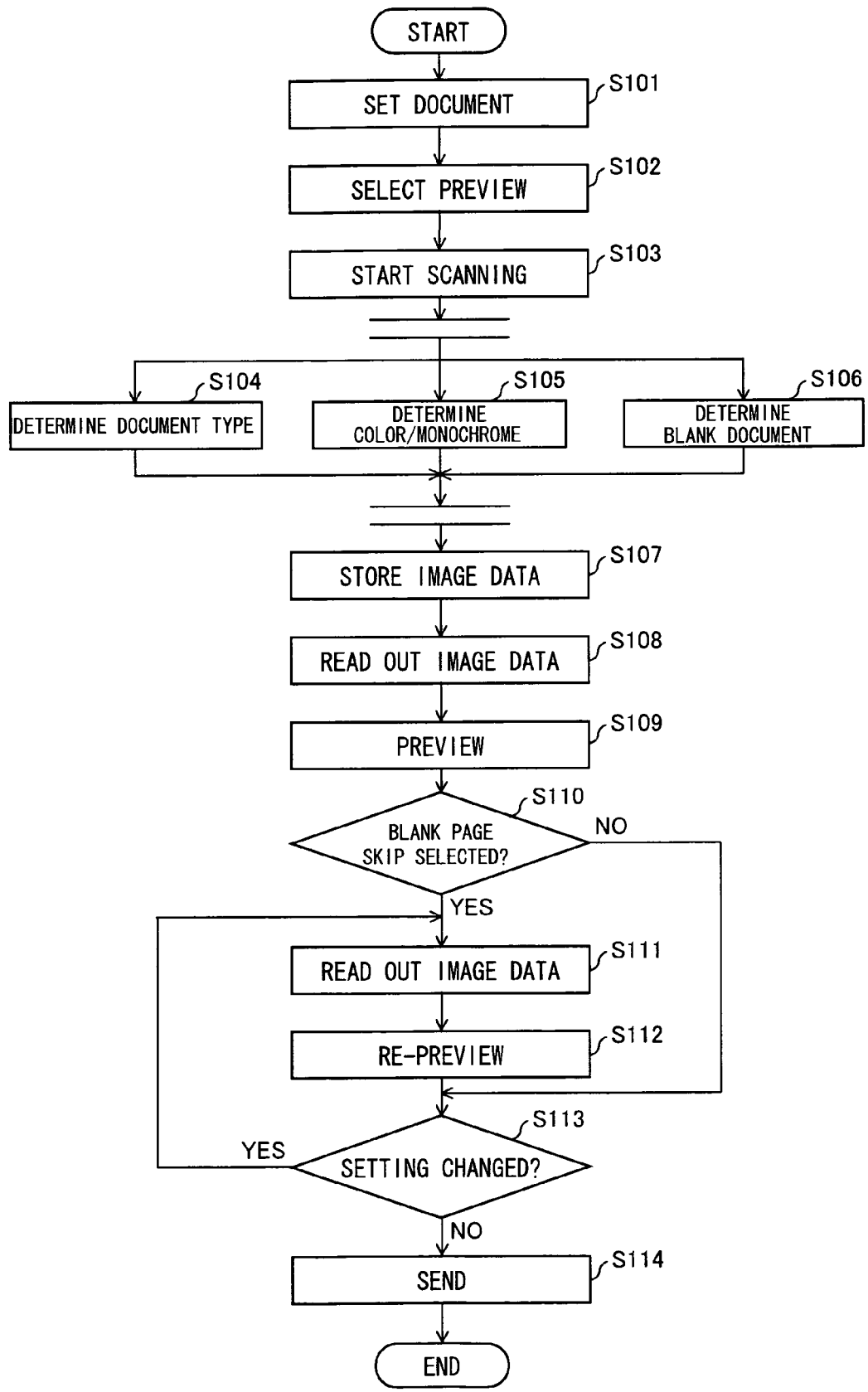
FIG. 13 is a flow chart showing steps for displaying a preview in the another embodiment.

Next, the following explains a process for performing a preview display in which a blank page document is skipped, with reference to a flow chart of FIG. 13. Here, the explanation is given by using an example of a case of an image transmission job for sending image data. The same process as the image transmission job is also carried out in an image print job and an image filing job.

As shown in FIG. 13, when it is detected that a document is set in the image input apparatus (image scanning apparatus) 101 (S101) and an input for selecting a preview is confirmed (S102), the image input apparatus 101 starts scanning the document (S103). Note that the document is detected in S101 by a document setting detection sensor 132 explained later.

Figure 14:
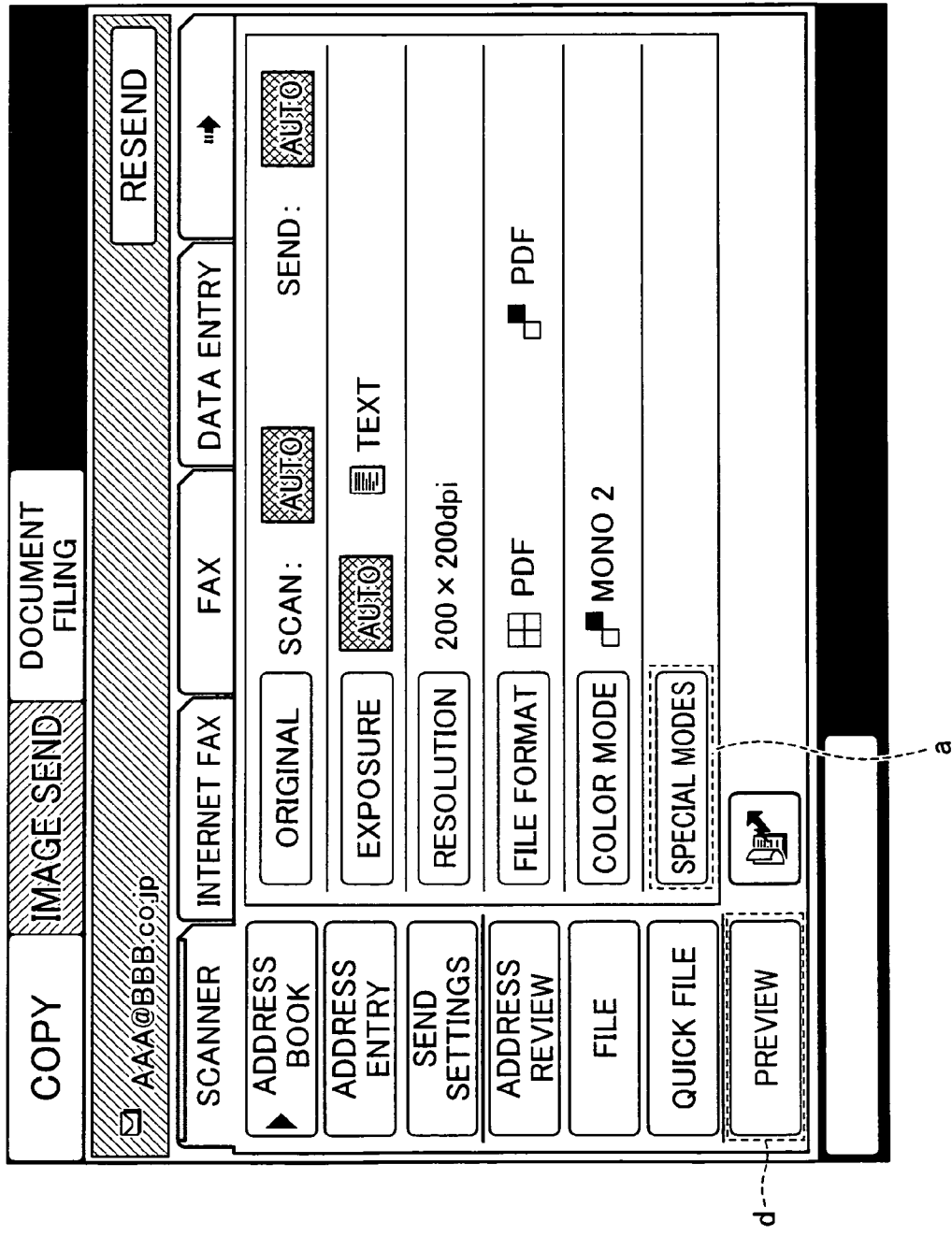
FIG. 14 is a diagram showing an example of a screen of an image display device of the another embodiment.
Figure 15:
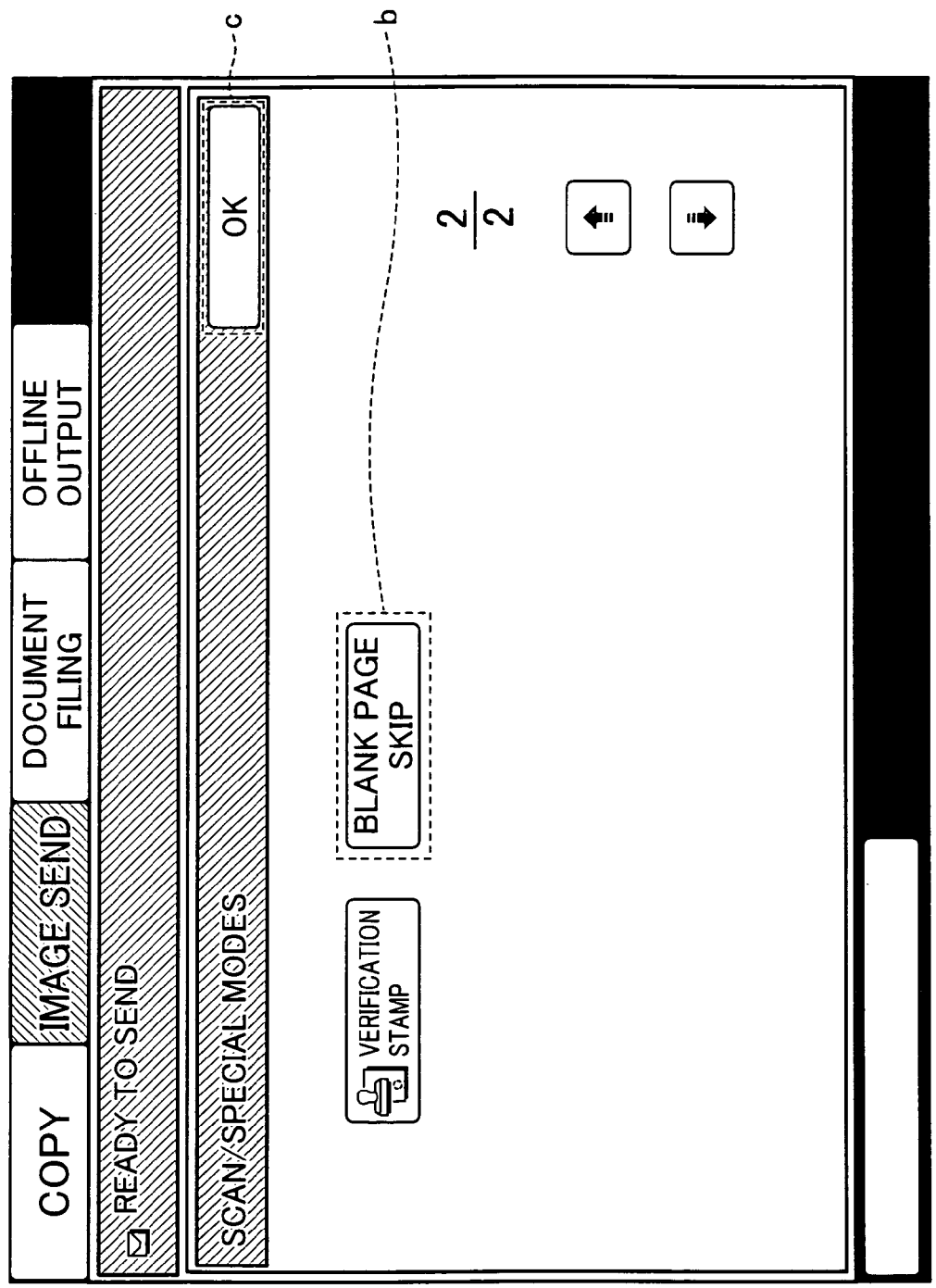
FIG. 15 is a diagram showing an example of a screen of the image display device of the another embodiment.

When a process of S102 is carried out, the input for selecting the preview is carried out by a user. The user makes the input from the image display device 104 serving as an input interface of the image forming apparatus 100. FIG. 14 shows a basic screen displayed on the image display device 104 at the image transmission job (when the image transmission mode is selected). When a "special modes" button a is pressed (selected) in the basic screen shown in FIG. 14, special modes, as shown in FIG. 15, that can be selected are displayed on a screen. When the user selects, in this screen, a "blank page skip" button b for selecting a blank page skip mode for displaying a preview in which a blank document is skipped and press an "OK" button c, the screen returns to the basic screen shown in FIG. 14. Then, when the user presses, in this screen, a "preview" button d and then a start button (not shown) on an operation panel, document scanning is started. Even when the user does not select the blank page skip mode and presses the start button (not shown) on the operation panel, document scanning is started.

Figure 19:
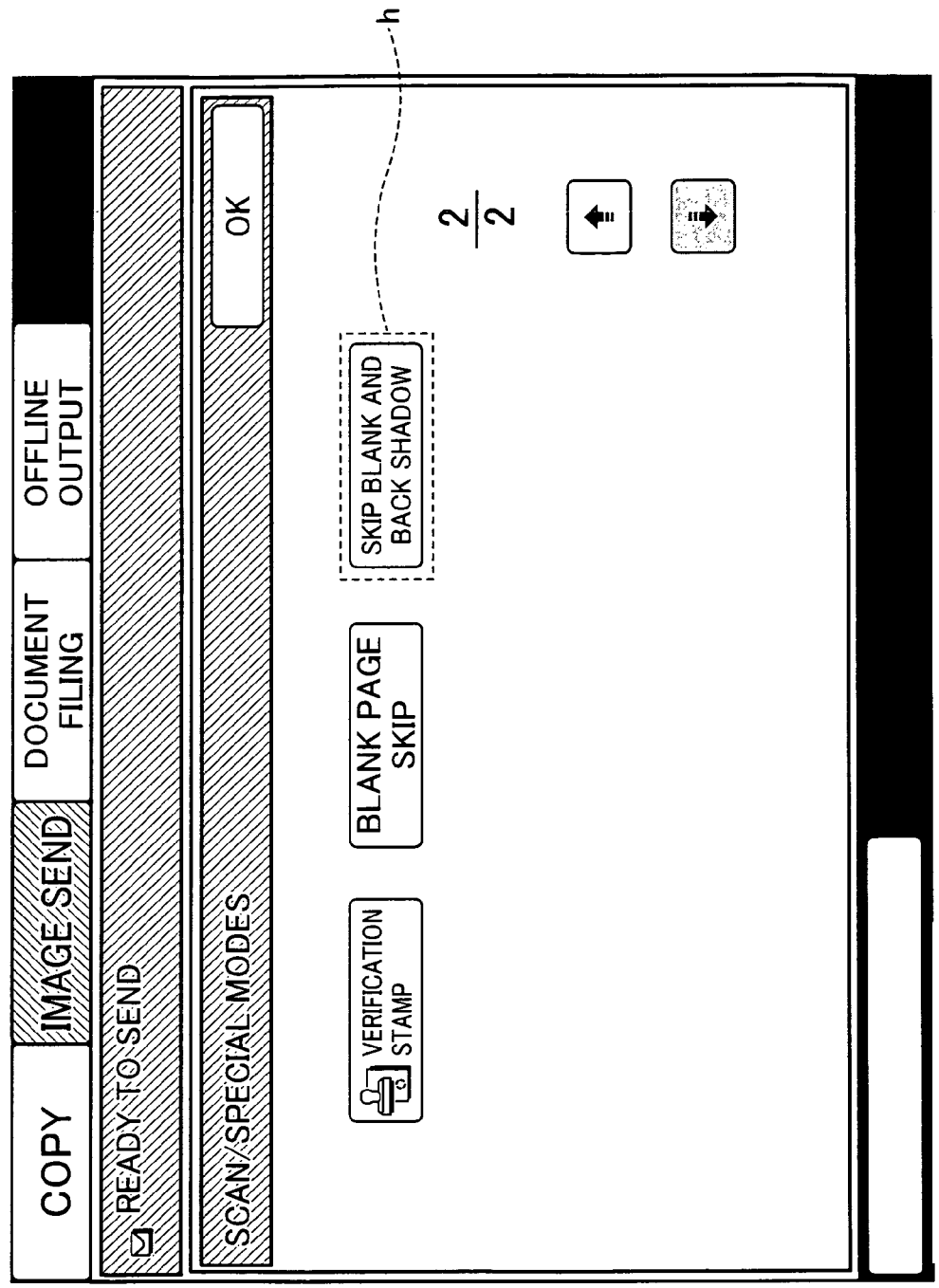
FIG. 19 is a diagram showing an example of a screen of the image display device of the another embodiment.

Further, as shown in FIG. 19, in addition to the "blank page skip" button b, there may be provided a "skip blank and back shadow" button h for selecting a mode for displaying a preview in which a blank document and an a back-shadow document (a document with a phenomenon of show-through) are skipped. In the case of skipping blank and back-shadow documents, the edge determination threshold, the first determination threshold for the number of edge pixels counted, the third determination threshold for the maximum-value-histogram document density width and the maximum-difference-histogram document density width are set to higher values (e.g., the edge determination threshold: 40, the first determination threshold: 7000, and the third determination threshold: 5) in a method of determining a blank document (blank page document) as compared with a case where only a blank document is skipped.

The image data of a document scanned is inputted into the image processing apparatus 102. The same processes as in Embodiment 1 are carried out in an A/D conversion section 2, a shading correction section 3, and an input processing section 4. The automatic document type discrimination section 5 carries out a process of document type determination (S104), a process of color/monochrome determination (S105), and a process of blank document determination (S106). Note that the order of the processes of S104 to S106 are not specifically limited. Any of the processes may be carried out ahead of another, or the processes may be carried out simultaneously. In a segmentation process section 6, a compression section 7, and a segmentation class signal compression section 8, the same processes as in Embodiment 1 are carried out and image data is stored in the storage device 107 (S107).

In the present embodiment, the preview is selected in S102. Accordingly, the image is read out from the storage device 107 (S108) and processes in subsequent stages are carried out in the same manner as in Embodiment 1 so that a preview is displayed by the image display device 104 (S109).

In a case where the blank page skip mode has been selected in S102, the image data to which a tag indicative of a blank document is added is not read out when the image data is read out in S108. Therefore, in S109, the data to which the tag indicative of a blank document is added is not displayed by the image display device 104. In other words, a preview display in which a blank document is skipped is carried out. Note that, in a case where the preview cannot be displayed in one screen of the image display device 104, the preview is displayed in a plurality of screens.

In cases where the blank page skip mode has not been selected in S102, all the image data that is scanned in the current process and that includes a blank document is read out when the image data is read out in S108. Therefore, in S109, the image display device 104 displays all the image data that is scanned in the current process and that includes a blank document.

Figure 16:
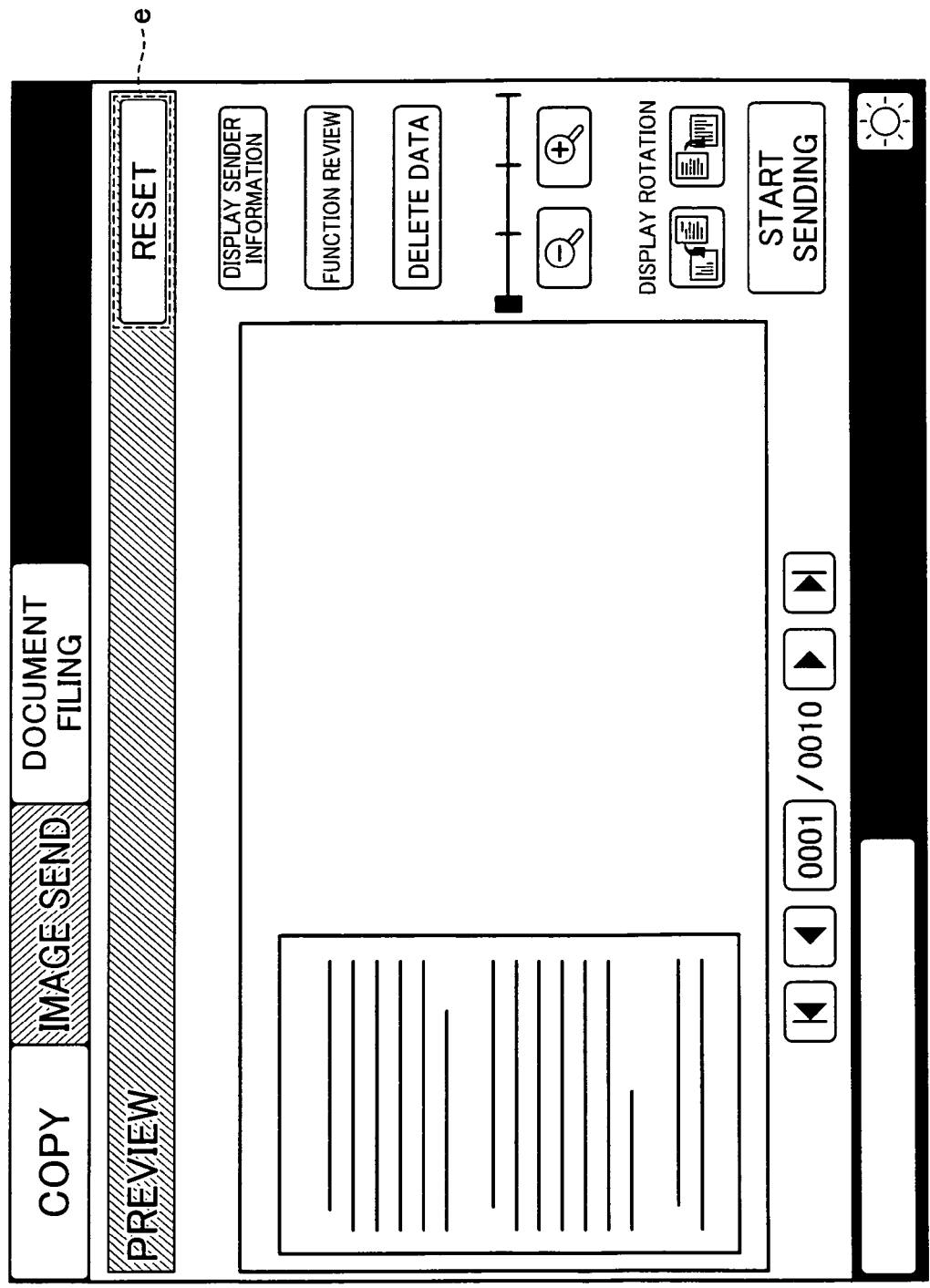
FIG. 16 is a diagram showing an example of a screen of the image display device of the another embodiment.
Figure 17:
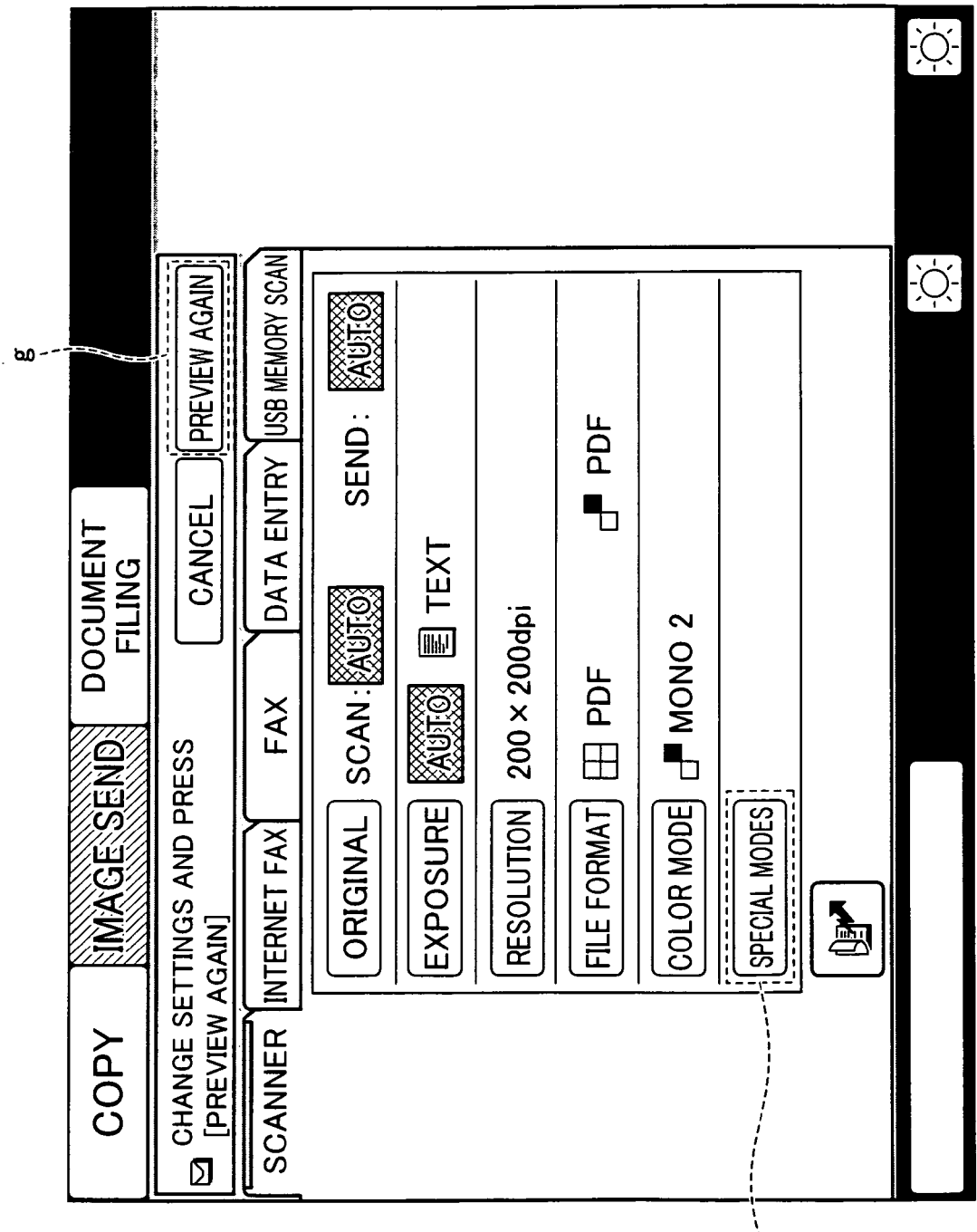
FIG. 17 is a diagram showing an example of a screen of the image display device of the another embodiment.

Subsequently, it is checked whether or not an input for selecting the blank page skip mode is made (S110). When a process of S110 is carried out, the user makes an input for selecting the blank page skip mode. When the user presses a "reset" button e in a preview screen shown in FIG. 16, a resetting screen shown in FIG. 17 is displayed. When a "special modes" button f in the resetting screen is pressed, the special modes, as shown in FIG. 15, that can be selected are displayed. When the "blank page skip" button b shown in FIG. 15 is selected and the "OK" button c is selected, the screen returns to the resetting screen shown in FIG. 17. In this resetting screen, when a "preview again" button g is pressed, the blank page skip mode is selected.

When it is determined that there is the input for selecting the blank page skip mode (YES in S110), image data to which a tag indicative of a blank document is not added is read out from the storage device 107 and a preview is displayed again (S112). In this re-preview display, the image data to which the tag indicative of a blank document is added is not displayed by the image display device 104. In other words, a preview display (re-preview display) in which a blank document is skipped is carried out. After the preview is displayed again, or when it is determined that there is no input for selecting the blank page skip mode (NO in S110), whether or not an input from the user for changing a setting is made is checked (S113). This setting change may be, for example, a process for displaying a preview after conversion from a color image to a monochrome image.

When it is determined that an input for changing the setting is made (YES in S113), S111 and S112 are repeated. Here, the re-preview display in S112 is carried out based on the setting change inputted. Note that, though the image data is read out again in S111 after S113 in the above case, S111 may be skipped depending on the setting changed in S113 and only the re-preview display in S112 may be carried out. When it is determined that the input for changing the setting is not made (NO in S113), the image data is sent out (S114) and the process is completed.

As described above, in the image processing apparatus 102, even in a case where the blank page skip mode has not been selected in advance (in a case where it is not set in advance to carry out a preview display in which a blank document is skipped), a preview display can be carried out by the image display device 104 without reading documents again in a manner in which image data of a blank document is skipped. The preview display in the aforesaid manner can be carried out by reading out image data of a document that is not a blank document, with reference to a result of determining a blank document (a tag indicative of a blank document). This makes it possible to provide an image processing apparatus that is convenient for a user and that is capable of carrying out a preview display in which the blank document is skipped.

(Image Input Apparatus)

Figure 18:
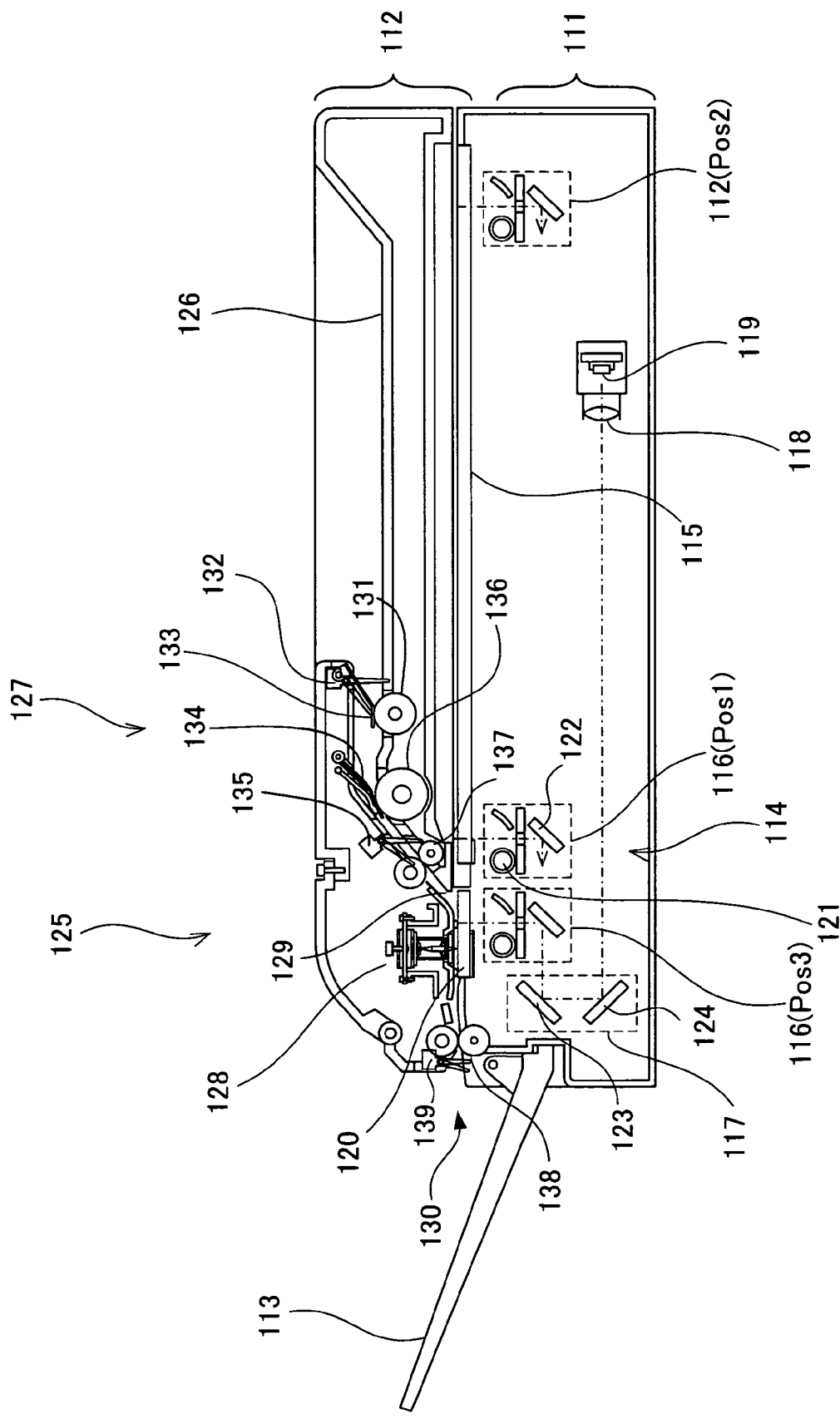
FIG. 18 is a diagram showing a configuration of an image input apparatus.

Next, one example of a configuration of the image input apparatus (document scanning apparatus) 101 is explained. FIG. 18 is a diagram showing one example of a configuration of the image input apparatus 101. As shown in FIG. 18, the image input apparatus 101 includes a lower housing 111, an upper housing 112, and a paper output tray 113.

As shown in FIG. 18, the lower housing 111 includes a first scanning section 114 and a first contact glass 115. The first scanning section 114 includes a first scan unit 116, a second scan unit 117, an imaging lens 118, a CCD (Charge Coupled Device) 119, and a second contact glass 120.

The first contact glass 115 is a platen on which a document to be scanned is to be placed in the static sheet scanning mode.

The first scan unit 116 moves at a constant velocity V from left to right along the first contact glass 115 and exposes the document. The first scan unit 116 includes a light source (exposure lamp) 121 and a first reflection mirror 122 for leading light reflected from the document to the second scan unit 117.

The second scan unit 117 moves at a velocity of V/2 so as to follow the first scan unit 116. The second scan unit includes a second reflection mirror 123 and a third reflection mirror 124 that lead the light from the first reflection mirror 112 to the CCD 119 through the imaging lens 118.

The imaging lens 118 forms, on the CCD 119, an optical image from the light reflected by the third reflection mirror 124.

The CCD 119 converts the light from the imaging lens 118 to an analog electric signal. Note that this electric signal will be converted to digital image data by the image processing apparatus 102.

The first scanning section 114 has a function to scan an image on a document being fed by members included in the upper housing 112 as described later, in addition to the function to scan the document placed on the first contact glass 115.

When the document on the first contact glass 115 is scanned, the first scan unit 116 moves for a predetermined distance in accordance with a document size detected by document size detection means (not shown) in a direction from a position Pos 1 to a position Pos 2 in FIG. 18. Meanwhile, when a document being fed is scanned, the first scan unit 116 stays at a position Pos 3. During standby, the first scan unit 116 stays at a position (home position) Pos 0 (not shown) at a midpoint between the position Pos 1 and the position Pos 3 in FIG. 18.

On an edge section of the first contact glass 115, a document reference plate (not shown) is provided. The document reference plate has an indicator showing a size and a placement direction of a document to be placed on the first contact glass 115. Therefore, a user can easily place a document on the first contact glass 115, following the indicator.

The upper housing 112 includes a second scanning section 125. The second scanning section 125 is for scanning an image of a document placed on a document setting tray 126. The second scanning section 125 includes a document feeding section 127, an image sensor section 128, a document conveying path 129, and a document delivering section 130.

The document feeding section 127 takes in a document placed on the document setting tray 126 into the second scanning section 125 and carries the document through the document conveying path 129.

The image sensor section (CIS: Contact Image Sensor) 128 is for reading a document being fed through the document conveying path 129. The document delivering section 130 delivers, onto the paper output tray 113, the document that has been read by the image sensor section 128.

The document feeding section 127 includes a paper pick-up roller 131, a document setting detection sensor 133, a document pressing plate 133, a friction pad 134, a feeding timing sensor 135, a conveyance roller 136, and a pair of alignment rollers 137.

The pick-up roller 131 and the document pressing plate 133 are for taking in a document detected by the document setting detection sensor 132 into the second scanning section 125. The friction pad 134, the conveyance roller 136, and the pair of alignment rollers 137 are for feeding, one by one, the document taken into the image sensor section 128 based on the detection result of the feeding timing sensor 135.

Note that a driving shaft of the pair of alignment rollers 137 is provided with an electromagnetic clutch (not shown). Accordingly, transmission of driving force from a driving motor (not shown) can be controlled, and the pair of alignment rollers 137 stays stationary in a case where there is no document. The pair of alignment rollers 137 is set to rotate in a direction in which the pair of alignment roller 137 feeds the document to a downstream side at the time when a front end of the document touches the feeding timing sensor 135 and a predetermined signal is transmitted from this sensor. After a front end of the document fed from an upstream side by the friction pad 134 and the conveyance roller 136 runs into a nip section of the pair of alignment rollers 137 that are in a stationary state and the document is bent to a predetermined degree, the pair of alignment rollers 137 starts to rotate so as to feed the document to a downstream side. At this time, due to the nip section of the pair of alignment rollers 137, the front end of the document is properly positioned so as to be perpendicular to a carrying direction. The pair of alignment rollers 137 forms, with the contact glass 120, a part of the document conveying path 129.

The document delivering section 130 includes a pair of document delivery rollers 138 and a document delivery sensor 139. An upper roller of the pair of document delivery rollers 138 is a driving roller and integrally formed with the housing 112 in a left section of the upper housing 112. The upper roller is driven by a driving mechanism in the upper housing 112. The upper roller of the pair of document delivery rollers 138 has a function to deliver, onto the paper output tray 113, the document having passed through the document conveying path 129, by conveying the document with a lower roller (driven roller) of the pair of document delivery rollers 138 provided to the lower housing 111 so as to rotate freely.

Further, the document delivery sensor 139 is positioned on a downstream side of the pair of document delivery rollers 138 and transmits delivery of the document to a scanning control section (not shown) for controlling scanning of the document.

Next, the following explains a document scanning process carried out by the image input apparatus 101. In the image input apparatus 101, a document is scanned (i) in the static sheet scanning mode in which an image is scanned while the document is not fed and (ii) in the sheet-feed scanning mode in which an image is scanned while the document is being fed. Further, in the sheet-feed scanning mode, it is possible to select a one-side mode for scanning one side of the document and a duplex mode for scanning two sides of the document. These modes (scanning modes) can be set through the operation panel (not shown) of the image display device 104.

For example, when a copier mode is selected through the operation panel and a start button is pressed in a state where (i) a document is set on the document setting tray 126 and (ii) the document is detected by the document setting detection sensor 132, the image input apparatus 101 is set to scan the document in the sheet-feed scanning mode. When the document is scanned in the sheet-feed scanning mode, the image input apparatus 101 is configured so that the one-side or duplex mode can be selected through the operation panel. Meanwhile, when a start button is pressed in a state where a document is not set on the document setting tray 126 (in a state where a document is not detected by the document setting detection sensor), the image input apparatus 101 is set to scan the document in the static sheet scanning mode. The mode is set in a method as described above. However, the method of setting the mode is not limited to this.

When the scanning mode is set to the static sheet scanning mode, only the one-side mode can be selected, so that the first scanning section 114 is used for scanning the document. In this case, the first scan unit 116 of the first scanning section 114 is positioned in the home position. According to an instruction given by the scanning control section, the first scan unit 116 moves to the position Pos 2 together with the second scan unit 117 while scanning the document placed on the first contact glass 115 from the position Pos 1. This allows the CCD 119 to receive reflection light in accordance with a document image. In this way, the first scanning section 114 scans an image formed on a lower face (front side) of the document.

When the scanning mode is set to the sheet-feed scanning mode, it becomes possible to select both the one-side mode and the duplex mode. When the one-side mode is selected in the sheet-feed scanning mode, only the first scanning section 114 is used to scan the document. When an instruction to select this mode is given, the first scan unit 116 of the first scanning section 114 moves to the position Pos 3 from the home position. The first scan unit 116 is then stays at the position Pos 3 and scans the document being fed. According to the instruction given by the scanning control section, the CCD 119 detects, on a lower side with respect to the document conveyed through the document conveying path 129 from the under side of the second contact glass 120. In other words, the first scanning section 114 scans the image formed on a lower face (front side) of the document.

When the duplex mode is selected in the sheet-feed scanning mode, both the first scanning section 114 and the second scanning section 125 are used for scanning the document. In this case, the first scan unit 116 of the first scanning section 114 stays at the position Pos 3 shown in FIG. 18, in the same manner as in the one-side mode in the sheet-feed scanning mode. Then, according to the instruction given by the scanning control section, the first scanning section 114 detects an image on the lower side with respect to the document conveyed through the document conveying path 129 from the under side of the second contact glass 120. Simultaneously, the image sensor section 128 of the second scanning section 125 detects an image formed on an upper face (back side) of the document being fed. In this way, in the duplex mode in the image input apparatus 101, the first scanning section 114 and the second scanning section 125 simultaneously read the images on respective sides (front and back sides) of the document being fed.

Then, image data generated by scanning the document is transmitted to the image processing apparatus 102.

The present embodiment can be achieved by storing, in a computer-readable storage medium containing control program code (executable program, intermediate code program, or source program) to be executed by a computer, an image processing method for displaying a preview in which a blank document (blank page document) is skipped without reading the document again. This makes it possible to provide a portable storage medium containing a program for the image processing method.

In the present embodiment, the storage medium may be a memory (not shown) for processing in a microcomputer. For example, the storage medium may be a program medium such as a ROM per se. Alternatively, the storage medium may be a program medium that can read by inserting the storage medium into a program reading device provided as an external storage device (not shown).

In either case, the contained program code may be arranged to be accessible to a microprocessor that will execute the program code. Alternatively, the program code may be arranged to be read and then downloaded to a program storage area (not shown) of the microcomputer. It is assumed that the download program is stored in advance in the main apparatus.

It should be noted here that the program medium is a storage medium arranged to be separable from the main body. The storage medium may be, for example, a tape, such as a magnetic tape or a cassette tape; a magnetic disk, such as a flexible disk or a hard disk, or an optical disk, such as CD-ROM/MO/MD/DVD/CD-R; a card, such as an IC card (memory card) or an optical card; or a semiconductor memory, such as a mask ROM/EPROM (erasable programmable read-only memory)/EEPROM (electrically erasable programmable read-only memory)/flash ROM. All these storage media hold a program in a fixed manner.

Alternatively, since the present embodiment is a system configuration connectable to communication networks including the Internet, the program medium may be a medium carrying the program code in a flowing manner as in the downloading of a program over a communication network. Further, when the program code is downloaded over a communications network in this manner, the download program may be stored in advance in the main apparatus or installed from another storage medium. The present invention can be realized in the form of a computer data signal, embedded in a carrier wave, in which the program code is embodied electronically. The storage medium is read by a digital color image forming apparatus of a program reading device provided in a computer system, whereby the aforementioned image processing method is executed.

As described above, an image processing apparatus of the present invention supplying input image data to an image display device for carrying out a preview display as well as to a job apparatus for executing any of an image print job, an image transmission job, and an image filing job, the input image data being image data of a document read by an image input apparatus, the image processing apparatus includes: a blank document determination section determining whether or not the input image data is image data of a blank document, regardless of a process mode set for setting a process with respect to the input image data; a storage device storing (i) a determination result that is made by the blank document determination section regarding the input image data and (ii) the input image data in association with each other; and a preview control section (i) reading out the input image data from the storage device and (ii) excluding the input image data determined as image data of a blank document by the blank document determination section, from images to be displayed by the image display device, when the image display device carries out a preview display of the input image data.

According to the configuration, it is determined whether or not input image data is image data of a blank document. In association with the determination result, the input image data is stored. Then, the input image data determined as image data of a blank document is excluded from the images to be displayed by the image display device. That is, at the time of a preview display, the display can be carried out with reference to the determination result of whether or not the input image data is image data of a blank document. Therefore, for example, even in cases where it is not set in advance to display a preview in which such a blank document (a blank page document, a solid-color document) is skipped, the preview can be displayed, without reading documents again, by reading out image data except the image data of a blank document with reference to the result of the determination in a storage device in a manner in which the image data of a blank document is skipped. This makes it possible to provide an image processing apparatus that is convenient for a user and that is capable of displaying a preview in which a blank document is skipped.

In addition to the above configuration, the image processing apparatus of the present invention may be arranged such that: the image input apparatus is able to select a sheet-feed scanning mode in which a document is scanned while feeding the document; and the blank document determination section determines whether or not the input image data is image data of a blank document in a case where the sheet-feed scanning mode is selected.

In the static sheet scanning mode in which, for example, a document is set on a platen and scanned, because a user sets a document one by one, the user may check each document. Therefore, a possibility of scanning a blank document is low. Meanwhile, in the sheet-feed scanning mode in which the document being fed is scanned, the document is automatically fed. However, the user may not check the document each time before the document is fed. Therefore, the possibility of scanning a blank document becomes high. According to the above configuration, because determination of a blank document is carried out in the sheet-feed scanning mode in which the document being carried is scanned, a process can be carried out efficiently.

In addition to the above configuration, the image processing apparatus of the present invention may be arranged such that: (i) the blank document determination section (a) obtains a number of edge pixels in the input image data and (b) compares the number of edge pixels with a first threshold for discriminating a blank document and a photograph document (a continuous tone photograph document) from other documents; and (ii) the blank document determination section (a) obtains, for each processing pixel of the input image data, a maximum of average pixel values of respective color components and a maximum difference that is a maximum value among differences between the average pixel values of the respective color components, (b) makes respective histograms for the maximum value and the maximum difference, (c) obtains, as a maximum-value-histogram document density width and a maximum-difference-histogram document density width, respective total values of numbers of bins each greater than a second threshold for determining whether or not a frequency-of-occurrence value of each of the histograms is a significant value, and (d) compares the maximum-value-histogram document density width and the maximum-difference-histogram document density width with a third threshold for discriminating between a blank document and a photograph document, so that, where (i) the number of edge pixels is equal to or less than the first threshold and (ii) both the maximum-value-histogram document density width and the maximum-difference-histogram document density width are less than the third threshold, the blank document determination section determines that the input image data is image data of a blank document.

According to the configuration, on the basis of the number of edge pixels, the maximum-value-histogram document density width, and the maximum-difference-histogram document density width of the input image data, it is possible to appropriately determine whether or not the input image data is image data of a blank document.

In order to solve the problems above, an image forming apparatus of the present invention includes the image processing apparatus described above, an image input apparatus, and an image display device for carrying out a preview display. According to the above configuration, it becomes possible to provide an image forming apparatus that makes it possible to display a preview in which a blank document is skipped without reading documents again.

In order to solve the problems mentioned above, an image processing method of the present invention for supplying input image data to an image display device for carrying out a preview display as well as to a job apparatus for executing any of an image print job, an image transmission job, and an image filing job, the input image data being image data of a document read by an image input apparatus, the image processing method includes the steps of: performing blank document determination for determining whether or not the input image data is image data of a blank document, regardless of a process mode set for setting a process with respect to the input image data; storing, into a storage device, (i) a determination result that is made by the step of performing the blank document determination and (ii) the input image data in association with each other; and carrying out the preview display by reading out the input image data from the storage device, wherein, in the step of carrying out the preview display, the input image data determined as image data of a blank document by the step of performing the blank document determination is excluded from the images to be displayed by the image display device.

According to the above method, the same effect as the image processing apparatus described above can be obtained. Therefore, without reading documents again, the preview display in which a blank document is skipped becomes possible.

Further, the image processing apparatus of the present invention can be achieved by a computer. In this case, the present invention encompasses (a) an image processing program causing the computer to function as each section of the image processing apparatus so that the image processing apparatus is achieved by the computer and (b) a computer-readable storage medium containing the image processing program.

According to these configurations, by causing a computer to read out and execute the image processing program, it is possible to achieve the same effect as the image processing apparatus described above.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below. Further, the numerical values outside of the ranges shown in this specification are encompassed in the present invention as long as such ranges are rational ranges that do not defeat the purpose of the present invention.

INDUSTRIAL APPLICABILITY

An image processing apparatus of the present invention can be used for apparatuses for processing image data and, in particular, for multifunction printers, copying machines, printers, and facsimile machines.

The invention claimed is:

1. An image processing apparatus supplying input image data to an image display device for carrying out a preview display as well as to a job apparatus for executing any of an image print job, an image transmission job and an image filing job, the input image data being image data of a document read by an image input apparatus, the image processing apparatus comprising:

a blank document determination section for determining whether or not the input image data is image data of a blank document;

a storage device for storing (i) a determination result that is made by the blank document determination section regarding the input image data and (ii) the input image data in association with each other;

a preview control section for (i) reading out the input image data from the storage device and (ii) controlling the image display device to carry out a preview display of the input image data; and an input section for accepting an input of a setting for excluding the image data of a blank document from the preview display before the blank document determination section performs said determining, in a case where the input section has not accepted the input of the setting, (i) the blank document determination section determining whether or not the input image data is image data of a blank document, (ii) the preview control section controlling the image display device to carry out a preview display of the input image data, and then (iii) the input section determining whether or not the input section has accepted an input of a resetting for excluding the image data of a blank document from the preview display, including an actuation of a reset, an input of a mode, an input of the setting for excluding the image data of a blank document from the preview display and an input of the preview again setting, and in a case where the input section has accepted the input of the resetting, the preview control section determining that input image data which has been determined as image data of a blank document by the blank document determination section is data excluded from the preview display, and carrying out the preview display of the image data of the document other than the image data of the blank document.

2. The image processing apparatus as set forth in claim 1, wherein:

the blank document determination section further determines whether or not the input image data is image data of a back-shadow document; and the preview control section is further for excluding the image input data determined as a back-shadow document by the blank document determination section from the images to be displayed by the image display device in response to a blank and back-shadow exclusion setting accepted by said input section.

3. The image processing apparatus as set forth in claim 1, wherein:

the image input apparatus is able to select a sheet-feed scanning mode in which a document is scanned while feeding the document; and the blank document determination section determines whether or not the input image data is image data of a blank document in a case where the sheet-fed scanning mode is selected.

4. An image processing apparatus supplying input image data to an image display device for carrying out a preview display as well as to a job apparatus for executing any of an image print job, an image transmission job, and an image filing job, the input image data being image data of a document read by an image input apparatus, the image processing apparatus comprising:

a blank document determination section determining whether or not the input image data is image data of a blank document, regardless of a process mode set for setting a process with respect to the input image data;

a storage device for storing (i) a determination result that is made by the blank document determination section regarding the input image data and (ii) the input image data in association with each other; and a preview control section (i) reading out the input image data from the storage device and (ii) excluding the input image data determined as image data of a blank document by the blank document determination section, from images to be displayed by the image display device, when the image display device carries out a preview display of the input image data, wherein:

(i) the blank document determination section (a) obtains a number of edge pixels in the image input data and (b) compares the number of edge pixels with a first threshold for discriminating a blank document and a photograph document from other documents; and (ii) the blank document determination section (a) obtains for each processing pixel of the input image data, a maximum of the average pixel values of respective color components and a maximum difference that is a maximum value among differences between the average pixel values of the respective color components, (b) makes respective histograms for the maximum value and the maximum difference, (c) obtains, as a maximum-value-histogram document density width and a maximum-difference-histogram document density width, respective total values of numbers of bins each greater than a second threshold for determining whether or not a frequency-of-occurrence value of each of the histograms is a significant value, and (d) compares the maximum-value-histogram document density width and the maximum-difference-value histogram document density width with a third threshold for discriminating between a blank document and a photograph document.

5. The image processing apparatus as set forth in claim 1, the image processing apparatus being able to supply, to any one of a job apparatus the executes an image print job, a job apparatus that executes an image transmission job, and a job apparatus that executes an image filing job, image processing data necessary for the job.

6. An image forming apparatus comprising an image processing apparatus as set forth in claim 1, an image input apparatus, and an image display device for carrying out a preview display.

7. An image processing method for supplying input image data to an image display device for carrying out a preview display as well as to a job apparatus for executing any of an image print job, an image transmission job and an image filing job, the input image data being image data of a document read by an image input apparatus, the image processing method comprising the steps of:

performing blank document determination for determining whether or not the input image data is image data of a blank document;

storing, into a storage device, (i) a determination result that is made by the step of performing blank document determination and (ii) the input image data in association with each other;

carrying out preview control by (i) reading out the input image data from the storage device and (ii) controlling the image display device to carry out a preview display of the input image data; and accepting an input of a setting for excluding the image data of a blank document from the preview display before the blank document determination is performed, wherein:

in a case where the input of the setting has not been accepted, (i) determining whether or not the image data is image data of a blank document, (ii) controlling the image display device to carry out a preview display, and then (iii) determining whether or not an input of a resetting for excluding the image data of a blank document from the preview display has been accepted, including an actuation of a reset, an input of a mode, an input of the setting for excluding the image data of a blank document from the preview display and an input of the preview again setting, and in a case where the input of a resetting has been accepted by determining that input image data determined as image data which has been determined as image data of a blank document is data excluded from preview display and carrying out the preview display of the image data of the document other than the image data of the blank document.

8. A non-transitory computer-readable storage medium containing an image processing program for operating an image processing apparatus as set forth in claim 1, the image processing program causing a computer to function as each section of the image processing apparatus.

9. The image processing apparatus as set forth in claim 1, wherein the preview control section controls the image display device to carry out again the preview display of the image data of the document other than the image data of the blank document, on the basis of (i) the determination result that is made by the blank document determination section, and (ii) the input image data which are stored in the storage section so as to be in association with each other.

* * * * *